United States Patent [19]
Ueno et al.

[11] Patent Number: 5,754,959
[45] Date of Patent: May 19, 1998

[54] MOBILE COMMUNICATION SYSTEM WITH A LOAD BALANCING FEATURE

[75] Inventors: Makoto Ueno; Takeshi Kunugi; Kazuya Ohyama; Hiroomi Yazaki, all of Yokohama, Japan

[73] Assignee: Fujitsu Limited, Kanagawa, Japan

[21] Appl. No.: 398,217

[22] Filed: Mar. 2, 1995

[30] Foreign Application Priority Data

Mar. 2, 1994 [JP] Japan ................................ 6-031696
Feb. 24, 1995 [JP] Japan ................................ 7-036554

[51] Int. Cl.$^6$ .............................. H04Q 7/20; H04Q 7/22
[52] U.S. Cl. ................. 455/453; 455/432; 455/436; 455/437
[58] Field of Search ............................ 379/58, 59, 60; 455/33.1, 33.2, 34.1, 422, 428, 429, 432, 434, 436, 437, 438, 439, 443, 444, 446, 450, 452, 453, 509, 511, 515, 519, 524, 561

[56] References Cited

U.S. PATENT DOCUMENTS

| | | | |
|---|---|---|---|
| 4,670,899 | 6/1987 | Brody et al. | 379/60 |
| 4,955,049 | 9/1990 | Ghisler | |
| 5,170,488 | 12/1992 | Furuya | |
| 5,305,466 | 4/1994 | Taketsugu | 456/33.1 |
| 5,418,839 | 5/1995 | Knuth et al. | 379/61 |

FOREIGN PATENT DOCUMENTS

| | | |
|---|---|---|
| 1 236 532 | 10/1988 | Canada . |
| 1 163 538 | 12/1985 | European Pat. Off. . |
| 0 544 449 | 6/1993 | European Pat. Off. . |
| 2-109431 | 4/1990 | Japan . |
| 4-220821 | 8/1992 | Japan . |
| 6-46473 | 2/1994 | Japan . |
| 6-164493 | 6/1994 | Japan . |
| 2 203 018 | 7/1990 | United Kingdom . |
| 2 243 976 | 11/1991 | United Kingdom . |
| 92/08325 | 5/1992 | WIPO . |
| 93/09640 | 5/1993 | WIPO . |
| 94/13114 | 6/1994 | WIPO . |

*Primary Examiner*—Dwayne Bost
*Assistant Examiner*—Nay Maung
*Attorney, Agent, or Firm*—Helfgott & Karas, P.C.

[57] ABSTRACT

A mobile communication system intended to control switching of a voice channel (handover) when a radio zone boundary is traversed; to quickly detect an unlawful mobile station; to equalize load if processing at a base control station is congested; and to constitute a location area for reducing control channel load due to simultaneous paging. The user is notified that a handover factor has been detected, and a switch enables the user's intention to be transmitted to the network to switch or stop the voice channel in accordance with the will of the mobile station user who is making the call. User accumulated call accounting information is totaled by the network and the mobile station individually for comparison to detect an unlawful mobile station. The number of base stations controlled by the base control station is, in real time, dynamically, changed to correspond to the state of congestion. Controls signals to the mobile stations are transmitted to a plurality of base control stations via a network of control lines. If the base control station detects process congestion, a portion of the controlled base stations is consigned to an adjacent base control station. The number of radio zones constituting the location area is, in real time, changed to correspond to the state of load for the call process to share load with the adjacent location area.

10 Claims, 38 Drawing Sheets

| INFORMATION ELEMENT | CONTENTS | INFO. LENGTH |
|---|---|---|
| TYPE OF MESSAGE | HAND-OVER REQ. | 1 |
| NETWORK NO. | COUNTRY NO., SERVICE GROUP NO. | 2 |
| OWN CH RECEIV. LEVEL | RECEIV. LEVEL USE CH | 1 |
| NO. OF ZONE SELECTED | 0~20 | 1 |
| PEACH CH NO. | ADJ. ZONE OF THE FIRST HIGHEST RECEIV. LEVEL | 1 |
| RECEIV. LEVEL | | 1 |
| PEACH CH NO. | ADJ. ZONE OF THE SECOND HIGHEST RECEIV. LEVEL | 1 |
| RECEIV. LEVEL | | 1 |
| | | |

FIG. 9

| INFORMATION ELEMENT | CONTENTS | INFO. LENGTH |
|---|---|---|
| TYPE OF MESSAGE | UNLAWFUL MS NOTIFY | 1 |
| NETWORK NO. | COUNTRY NO., SERVICE GROUP NO. | 2 |
| LAWFUL CHARGE | DATA LENGTH AND NOTIFIED CHARGE | n |
| UNLAWFUL CHARGE | DATA LENGTH AND CALCULATED CHARGE | n |

| MS ID |
|---|
| SUBSCRIBER PHONE NO. |
| CHARGE INFO. |
| LOCATION NO. |
| UNLAWFUL INFO. |

← 図 16

UNLAWFUL : 01
NO UNLAWFUL : 00

FIG. 13

IF B, D, E, F AND H ARE SEPARATED, A, C AND G ARE BROUGHT TO BE APART FROM EACH OTHER

CONFIGURATION OF BSs

CONNECTION RELATIONSHIP MATRIX

BEFORE SEPARATION

|   | A | B | C | D | E | F | G | H | I | J | K |
|---|---|---|---|---|---|---|---|---|---|---|---|
| A | 1 | 1 | 2 | 1 | 2 | 2 | 3 | 3 | 4 | 4 | 4 |
| B | 1 | 1 | 1 | 1 | 1 | 2 | 3 | 3 | 4 | 4 | 4 |
| C | 2 | 1 | 1 | 2 | 1 | 2 | 3 | 3 | 4 | 4 | 4 |
| D | 1 | 1 | 2 | 1 | 1 | 1 | 2 | 2 | 3 | 3 | 3 |
| E | 2 | 1 | 1 | 1 | 1 | 1 | 2 | 2 | 3 | 3 | 3 |
| F | 2 | 2 | 2 | 1 | 1 | 1 | 1 | 1 | 2 | 2 | 2 |
| G | 3 | 3 | 3 | 2 | 2 | 1 | 1 | 1 | 1 | 1 | 2 |
| H | 3 | 3 | 3 | 2 | 2 | 1 | 1 | 1 | 2 | 1 | 1 |
| I | 4 | 4 | 4 | 3 | 3 | 2 | 1 | 2 | 1 | 1 | 2 |
| J | 4 | 4 | 4 | 3 | 3 | 2 | 1 | 1 | 1 | 1 | 1 |
| K | 4 | 4 | 4 | 3 | 3 | 2 | 2 | 1 | 2 | 1 | 1 |

AFTER SEPARATION

|   | A | B | C | D | E | G | H | I | J | K |
|---|---|---|---|---|---|---|---|---|---|---|
| A | 1 | 1 | 2 | 1 | 2 | 0 | 0 | 0 | 0 | 0 |
| B | 1 | 1 | 1 | 1 | 1 | 0 | 0 | 0 | 0 | 0 |
| C | 2 | 1 | 1 | 2 | 1 | 0 | 0 | 0 | 0 | 0 |
| D | 1 | 1 | 2 | 1 | 1 | 0 | 0 | 0 | 0 | 0 |
| E | 2 | 1 | 1 | 1 | 1 | 0 | 0 | 0 | 0 | 0 |
| G | 0 | 0 | 0 | 0 | 0 | 1 | 1 | 1 | 1 | 2 |
| H | 0 | 0 | 0 | 0 | 0 | 1 | 1 | 2 | 1 | 1 |
| I | 0 | 0 | 0 | 0 | 0 | 1 | 2 | 1 | 1 | 2 |
| J | 0 | 0 | 0 | 0 | 0 | 1 | 1 | 1 | 1 | 1 |
| K | 0 | 0 | 0 | 0 | 0 | 2 | 1 | 2 | 1 | 1 |

FIG. 29

| TYPE | MODIFYING METHOD | CHANGE OF LOAD IN OWN LA | | | CHANGE OF LOAD IN ADJACENT LA | | |
| --- | --- | --- | --- | --- | --- | --- | --- |
| | | LOCATION REGISTRATION | PAGING | NUMBER OF MS | LOCATION REGISTRATION | PAGING | NUMBER OF MS |
| DISPERSE | DISPERSE | ↗ | ↗ | ↗ | ↖ | ↖ | ↗ |
| NEW LNo. | GIVE NEW LNo. TO DIVIDED RADIO ZONE | ↗ | ↗ | ↗ | — | — | — |
| OWN LNo. DELETE | DELETE OWN LNo. IN ADJACENT LA | — | ↗ | — | ↖ | — | ↑ |
| ADJACENT LNo. DELETE | DELETE ADJACENT LA'S LNo. IN OWN LA | ↖ | ↗ | ↖ | — | — | ↗ |

FIG. 39

MOBILE COMMUNICATION SYSTEM WITH A LOAD BALANCING FEATURE

BACKGROUND OF THE INVENTION

1. Field of the Invention

The present invention relates to a mobile communication system which is capable of (1) controlling switching the voice channel at the time of traversing the boundary between radio-zones, (2) early detecting unlawful mobile station, (3) equalizing loads when the processes in a base control station are congested, and (4) reducing load for a control channel when many calls are made simultaneously by properly constituting a location area.

2. Description of the Related Art

FIG. 1 is a diagram showing the constitution of a mobile communication system to which the present invention is applied.

The mobile communication system comprises a mobile service switching center (MSC) 1 having communication lines connected to each of mobile base stations and another switching network such as a public switched network (PSTN) or integrated service digital network (ISDN) and establishing communication lines for connecting mobile stations to one another or for connecting a mobile station to another network; base control station (BCS) 2 which connects each mobile base station and the mobile service switching center to each other to control calls, administrate mobile stations, control mobile base stations, control the connection with another network and control switching of a control zone; mobile base stations (BS) 3 having functions of controlling calls, controlling mobile stations, controlling radio channels, controlling switching of control zones and performing radio communication with a mobile station; and mobile stations (MS) 4 having functions of controlling calls, measuring intensity of electric field of a mobile base station and man-machine interface.

The mobile base station transmits/receives control signals to and from the mobile station through a radio control channel to process a call, administrate movement and transmits/receives voice signals through a radio voice channel.

A system consisting of mobile service switching center, the base control station and base stations is hereinafter called a mobile network.

Referring to FIG. 1, the radio mobile base station (BS) 3 has a zone, in which radio wave transmitted by the same is able to reach, as a radio zone. The radio zone is also called a cell. A plurality of mobile base stations are disposed adequately to fully cover the service area. Each mobile base station has a radio transmitting/receiving portion, and radio channels to which a frequency is assigned that is different from those assigned to adjacent mobile base stations. The mobile base station is controlled by the base control station to directly perform communication with a mobile station present in the radio zone thereof through the radio channel so as to transmit/receive a call, control calling, administrate the mobile station, administrate the radio channel, and control switching of the control zone. The mobile base station notifies control information to mobile stations in the zone thereof through the radio channel, called a perch channel having a predetermined frequency, the control information being notified in a method of broadcasting.

The mobile station uses a voice channel between the mobile station and the mobile base station to provide a call service for transmitting/receiving voice signal and data. The call with the mobile station is performed through the voice channel to a mobile base station adjacent to the mobile station. If the mobile station traverses the bound of the radio zone during a call, switching is performed to the voice channel of a mobile base station having a radio zone to which the mobile station has been entered. This switching process is called a hand-over process.

The mobile station periodically measures the receiving level of the voice channel of the mobile base station, through which a call is being made and the receiving level of the control channel of the adjacent mobile base station to report the radio condition to the mobile base station of the mobile station. In a case where the mobile station removes from the radio zone of the corresponding mobile base station to move to that of another mobile base station, the voice channel is switched to the voice channel of the mobile base station to which the mobile station is moved so that the call is continued.

Conventional switching of the voice channel has been automatically performed under control of the mobile station and the mobile network. That is, if a mobile station which is making a call or a mobile station has detected a need for a hand-over due to weakening of the intensity of the received wave or the like, the mobile network unconditionally switches the voice channel if a vacant voice channel is present. Therefore, a user of the mobile station cannot concern the hand-over and the intention of the user, who is making a call, has not been considered.

However, the number of users of mobile stations has been increased recently and the methods of using the mobile stations have been varied significantly. If the quality of the call has degraded to a predetermined threshold level, the mobile network switches the channel. However, since the criterion of the evaluation of the call quality varies considerably among users, users sometimes have disapproval about the predetermined threshold and have the following desires: "even if the call condition becomes worsen, the call will be ended soon and therefore the present call line is intended to be maintained" or "although the call condition is allowable (the condition for the hand-over is not yet satisfied according to network), the hand-over to a mobile base station having a better voice channel is required". Therefore, service in which the intention of the user is considered has been desired.

When the mobile station requires service, such as connection of the like, the subscriber's No., the No. of the mobile station and the like are notified to the mobile network. The mobile network refers to data of subscribers stored therein to decide whether or not the subscriber is a valid subscriber before it provides the service.

However, if someone steal the valid subscriber's No. or the No. of the mobile station to require the service by using the stolen Nos. as if it is a valid mobile station, the network determines that the mobile station is a valid station and provides the service. Furthermore, the network demands payment of the charge of this service to the valid subscriber having the foregoing subscriber's No. To prevent this, the validity of the mobile station has been confirmed by a scramble (bit scramble is effected with PN code using, as the initial value, the color code transmitted from the network at the time of the activation of the mobile station) or an identification (the mobile station subjects random numbers notified from the network to a predetermined calculation in accordance with an equation previously supplied to each mobile station; and returns the result to the network; and the network subjects the same random numbers to the same calculation to subject the returned result to a comparison to confirm the mobile station is the valid mobile station).

However, unlawful mobile stations have shrewd arrangement and the foregoing scramble or identification methods can be analyzed in about several months. Thus, an unlawful mobile station capable of performing the same operation as that of a valid mobile station can be forged. Although an advanced secret process or the like is included in the system as described above, any of fixed methods can be analyzed sooner or later. With the conventional validity confirming methods using any of scramble, identification or secret items, the network cannot recognize the forged unlawful mobile station. Therefore, a problem rises in that a charge of the mobile communication service is accounted to a lawful subscriber, which has been stolen by the unlawful mobile station although the service was given to the unlawful subscriber.

Then, a conventional countermeasure against congestion in the control process to be performed in the base control station or against congestion of calls from mobile stations will now be described.

If a local accident or fire increases calls in a specific radio zone or its surrounding radio zone, processes for transmitting call control signals from the mobile base stations to the mobile stations and control signals, such as operation signals, for operating the mobile base stations are concentrated into a specific base control station that administrates the specific mobile base stations. As a result, the quantity of calls to be controlled in the specific base control station, such as connection and suspension of calls and hand-over of the channel, increases. In the foregoing case, a fault of equipment sometimes takes place in the mobile station. A large quantity of the information about the fault is notified to a specific base control station, thus sometimes causing a state of congestion.

Except the foregoing accidental causes, the quantity of calls to be controlled sometimes increases in a predetermined period or time zone due to change in the population between night and day in the center of a city or an event such as Olympic. In this case, the telephone call cannot easily be connected although it cannot be said as the state of congestion.

To overcome the foregoing problem, if the quantity of calls to be controlled through the controlled mobile base station increases, information of call restriction or the like is notified to the mobile base station to restrict the number of mobile stations that access the mobile base station or all of call receipts are rejected. As a result, the quantity of calls to be controlled through the mobile base station does not exceed a predetermined quantity. However, the mobile station, the call from which has been rejected, calls an adjacent mobile base station. Thus, the quantity of calls to be controlled by another base control station for administrating the adjacent mobile base station increases. Although any of the base control station is not brought to the congested state, the number of mobile stations, the access from each of which is rejected, increases. Thus, a state where the telephone calls cannot easily be connected over a wide area is realized.

The quantity of calls to be controlled is affected by the number of mobile stations present in the radio zone. In a case where all communication lines in a certain radio zone are busy, if a call demand is made from a mobile station, then the base control station sometimes intends to assign a free voice channel of an adjacent radio zone. Also in this case, the control lines are used and thus the quantity of processes to be performed by the base control station increases. Since the location registration is performed by a mobile station which is not engaged in a telephone call, the number of mobile stations traversing the boundary of the location area increases if the number of mobile stations increases. Therefore, the location registration demands through the control line increases. Since the location registration request is not the subject of the call restriction, the quantity of engagement of the control lines cannot be decreased in spite of the call restriction.

As described above, the conventional call restricting method has a problem in that it cannot cope with change in the location registration request depending upon the number of mobile stations, change in the quantity of calls to be controlled depending upon the time zone and day and change in the quantity of calls to be controlled depending upon the change in the traffic caused from an accident.

The mobile station moves freely among radio zones. In a case where the mobile network calls a specific mobile station, it is necessary to detect the area in which the mobile station is present.

Therefore, the mobile station registers its location as the location No. into a home memory provided for the mobile service switching center to cause the mobile network to recognize the area. If the position of the mobile station is shifted due to movement, new location No. is again registered.

To achieve this, the overall service area covered by the mobile network is divided into a plurality of areas each of which consists of a plurality of radio zones. Each area is given a unique location No. An area consisting of radio zones thus divided and having the same location No. is called a location area.

The location registration performed by the mobile station is carried out as follows.

Each mobile base station uses a perch channel to always broadcasts notification information including the location No. of the own radio zone to the mobile station in the corresponding zone.

The mobile station, having entered in idle state, or the mobile station shifted from another radio zone, receives the location No. of its radio zone in accordance with the notification information. If the received location No. is different from the final location No. memorized in the mobile station, it request location registration to the mobile base station while adding the ID thereof. The mobile base station requests the mobile service switching center to register the location through the base control station. The mobile service switching center writes a new location No. of the subject mobile station on the subscriber's information storage portion of the home memory thereof and notify completion of receipt of the location registration to the mobile station. The mobile station stores the new location No. as the final location No.

In a case where a certain mobile station is called from the mobile network, the location No. of the location area in which the mobile station is present is taken from the home memory of the mobile service switching center that stores the subscriber's information of the mobile station. Then, paging signals are simultaneously transmitted to all radio zones of the location area having the foregoing location No. through the control channels. The mobile station returns a response signal to the mobile base station in the radio zone in which the mobile station is present so that communication between the mobile station and the mobile network is enabled.

Thus, paging of the mobile station is performed by transmitting the same paging signal from all mobile base stations in the same location area to the subject mobile station. Therefore, the load for the control channel for transmitting the paging signal in the mobile base station in which the mobile station is not present is made too heavy. Accordingly, the conventional mobile communication system predicts the number of mobile stations for each zone to determine the size of the location area and the number of the control channels for paging. However, the size of the location area and the number of page signals has a correlated relationship. That is, if the location area is large, a large number of mobile stations are present in the area. Therefore, the number of page signals increases and the load for the control channel is made too heavy. If the location area is small, the number of page signals decreases and thus the load of the control channel is reduced. However, the frequency for the mobile station to change the location area is raised and the load for the control channel to perform the location registration operation is made heavier.

Accordingly, a multi-location No. method has been employed recently in which a plurality of location Nos. are given to one radio zone to lighten the load at the time of performing the location registration operation. In the multi-location No. method, a plurality of mobile stations in the same radio zone are divided into groups and different location areas are given to the groups. According to the foregoing method, concentration of location registration traffic into a specific radio zone on the boundary of the location area can be prevented. Furthermore, the mobile station selects one location area from a plurality of the location areas formed into a multiple constitution in such a way the the present location of the mobile station to be located near the central portion of the location area. Therefore, the possibility that the mobile station traverses the own location area that has been registered can be lowered. Thus, concentration of the location registration traffic can be prevented. However, the call signal must be transmitted to the mobile stations present in the plural location areas in the multiple form. Therefore, the quantity of load for the control channel for transmitting the page signals cannot be reduced.

SUMMARY OF THE INVENTION

An object of the present invention is to provide a mobile communication system capable of reflecting the intention of a user of a mobile station which is making a call when the hand-over is going to process.

Another object of the present invention is to cause a mobile network to early detect an unlawful mobile station to reject service.

Another object of the present invention is to equalize the quantity of process to be performed by a plurality of base control station by dispersing a portion of controlled mobile base stations to another base control station in order to prevent congestion of the control channel that is processed by the base control station.

Another object of the present invention is to prevent an overload of control channels due to the paging.

In order to achieve the foregoing objects, a mobile station according to the present invention comprises hand-over-requirement notifying means which notifies, to a user, causing of hand-over: switching requirement for a radio channel during a call; switching selection means with which the user set whether or not the channel is switched during the telephone call to the mobile station; and switching selection notifying means for notifying to the base station whether the setup of switching the radio channel has been performed. A mobile network comprises a channel switching prohibiting means for prohibiting the radio channel from being switched and for setting up a minimum receiving level lower than a usual minimum receiving level when the switching selection informing means prohibits the radio channel switching, the minimum receiving level being utilized to determine that the call is to be terminated.

As an alternative to this, the mobile station is provided with a switching request setting up means for a mobile telephone user to set up in said mobile station a request for switching the radio channel during the call; and a switching request notifying means for notifying the base station of said set up request for switching the radio channel. The mobile station is provided with a radio channel switching means, upon receiving said request for switching the radio channel, for selecting a second base station having a highest receiving level from said mobile station among neighbouring base stations in the vicinity of the (first) base station currently communicating with the mobile station, and for switching the radio channel for presently communicating with said mobile station to a second radio channel via said second base station.

As a result, the right to determine the switching of the radio channel is given to the user. Therefore, the degree of satisfaction for the user can be improved.

The mobile network according to the present invention comprises user information storing means for storing user information to correspond to the ID (identifier) of the mobile station, the user information being accumulated account information, the number of received calls placed by the mobile station, and the location No. which has been registered finally, that are changed whenever a particular service is given to the mobile station; and a service prohibiting means for prohibiting the communication service to the mobile station upon receiving a non-coincidence notice from the mobile station having the subject ID. The mobile station comprises a mobile station user information storing means for renewing and storing the user information which changes each time requesting the particular service and a non-coincidence notifying means for comparing the user information notified at the predetermined time to own station from the mobile network with the independently stored user information so as to notify the mobile network of the non-coincidence if they do not coincide with each other.

Whenever communication service is given by the mobile network to the mobile station, information which is known by only the mobile network and the mobile station to which the service has been given is used to update the possessed user information by the same algorithm. If an unlawful mobile station is given communication service as it is a lawful mobile station, the network is updated but the lawful mobile station is not updated. Therefore, the two user information items are subjected to a comparison at a certain moment. If they do not coincide with each other, an unlawful mobile station can be detected.

The base control station according to the present invention comprises load detecting means for detecting load in control processing for processing the call at the base control station; and subordinate base station number changing means for REAL TIME DE changing any time a controlled stations under control of the base control station so that said load at each base control station be possibly equal. The load detection means uses the operating rate of a CPU in the corresponding base control station or the operating rate of a receiving buffer to detect that the control process is congested. The means for changing the number of controlled mobile base stations separates a portion of controlled mobile base station to consign to another base control station to decrease the number of controlled mobile base stations.

At this time, division of the administration area controlled by the base control station is prevented by adequately selecting the mobile base stations to be switched. The control lines of each mobile base station to the mobile network is constituted such that connections to a plurality of base control station is enabled. The base control station connects the control line from the controlled mobile base station to another base control station so that the controlled mobile base station is switched to be controlled by another base control station.

The mobile network according to the present invention comprises load detecting means for detecting an amount of load of control processing related to the paging and location area modifying means for dynamically modifying a constitution of the location areas according to a result detected by the load detecting means so that said amount of load of the processing related to the paging be possibly equal to each location area. The load detection means detects, as the quantity of load, one or more factors such that the number of page signals transmitted to the same location area in a unit time period, the number of mobile stations present in the same location area and the number of location registration request from the mobile station.

BRIEF DESCRIPTION OF THE DRAWINGS

FIG. 9 is a configuration of hand-over request message;

FIG. 12 is a configuration of an unlawful MS notifying message;

FIG. 13 shows an example of the configuration of subscriber's information;

FIG. 29 is a shortest route matrix before and after the mobile base station F is separated;

FIG. 39 shows change in the quantity of load due to change in the constitution of the location area.

DESCRIPTION OF THE PREFERRED EMBODIMENT

A first embodiment of the present invention will now be described with reference to FIGS. 2 to 9.

According to the first embodiment, there is provided a system arranged such that even if the network recognizes that the voice channel must be switched, if a user rejects switching of the voice channel, then the call can be continued without switching.

Figure 2:
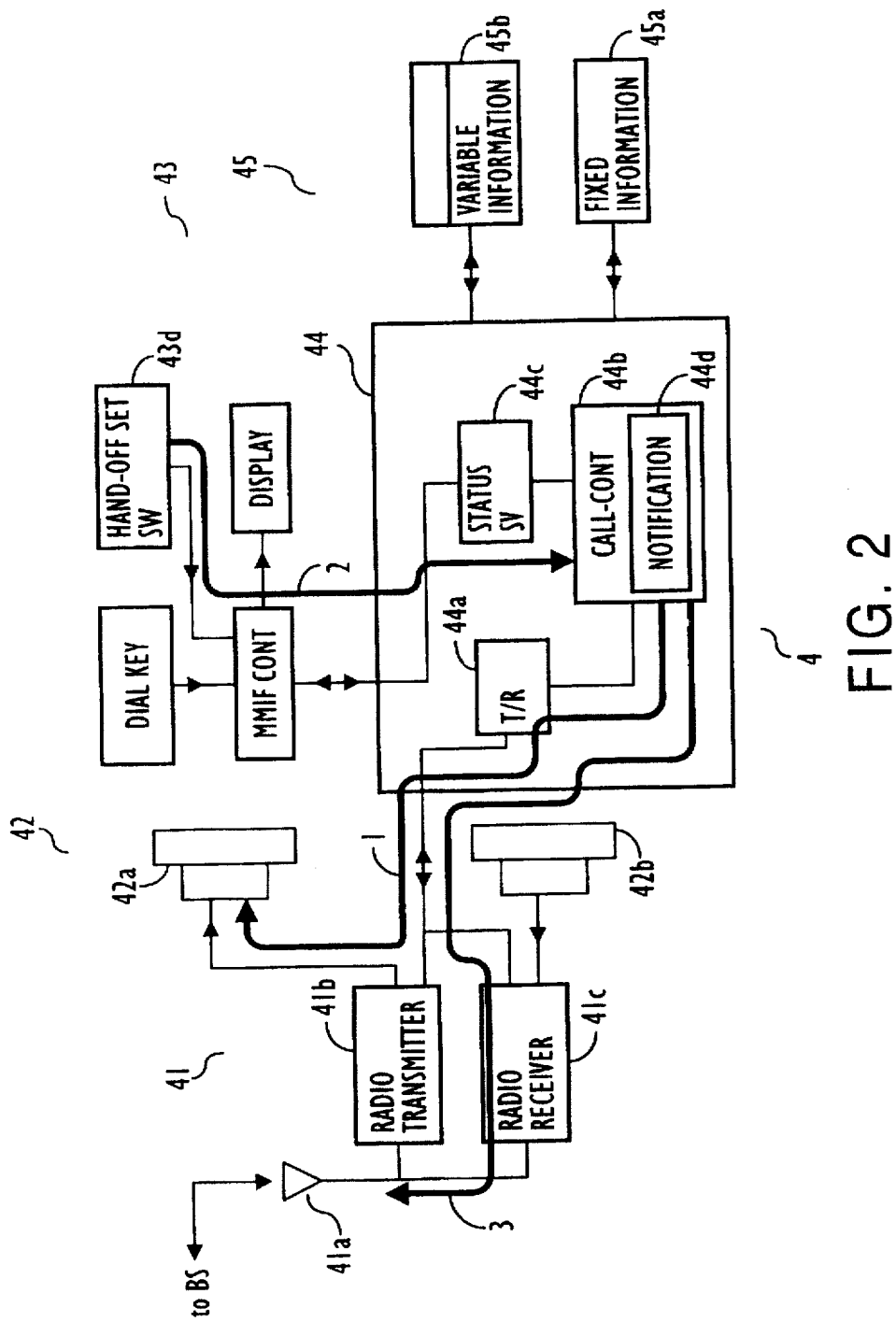
FIG. 2 is a block diagram of a mobile station according to a first embodiment.

FIG. 2 shows the constitution of a mobile station according to the first embodiment of the present invention.

The mobile station 4 comprises, a radio transmitting/receiving portion 41, a voice input/output portion 42, a man-machine interface (MMIF) 43, a controller 44 and a storage 45.

The radio transmitting/receiving portion 41 comprises an antenna 1a, a radio receiver 41b and radio transmitter 41c. The radio receiver 41b demodulates a radio signal received by the antenna 41a and takes out a voice call signal to supply it to a speaker 42a or an earphone, or takes out control information to supply it to the controller 44. The radio transmitter 41c converts transmitted voice supplied from a microphone 41c and control information, to be notified from the controller 44 to a mobile network, into a radio signal to transmit it to a radio mobile base station through the antenna 41a.

The controller 44 operates a CPU system by means of software to perform a variety of controls, the controller 44 comprising a transmitting/receiving function (TR FUNCTION) 44a for transmitting/receiving control messages to and from the radio transmitting/receiving portion, a call-control function (CALL CONT) 44b for making and decoding a message for controlling a call and a status supervising function (STATUS SV) 44c for transmitting, to the man-machine interface 43, information to be notified to the user and receiving information inputted by the user from the man-machine interface 43.

The storage 45 comprises a fixed information storage 45a for storing fixed information including a variety of ID information peculiar to the mobile station 4, and a variable information storage 45b for storing variable information such as latest registered location number which is changed whenever service is given from the mobile network and that for call control.

The mobile station 4 further comprises a notification function 44d for notifying the user that the call-control function 44b encounters a factor requiring switching of the channel, and a hand-over setting switch 43d for setting to the man-machine interface 43 whether or not the user has prohibited switching of the voice channel.

Figure 3:
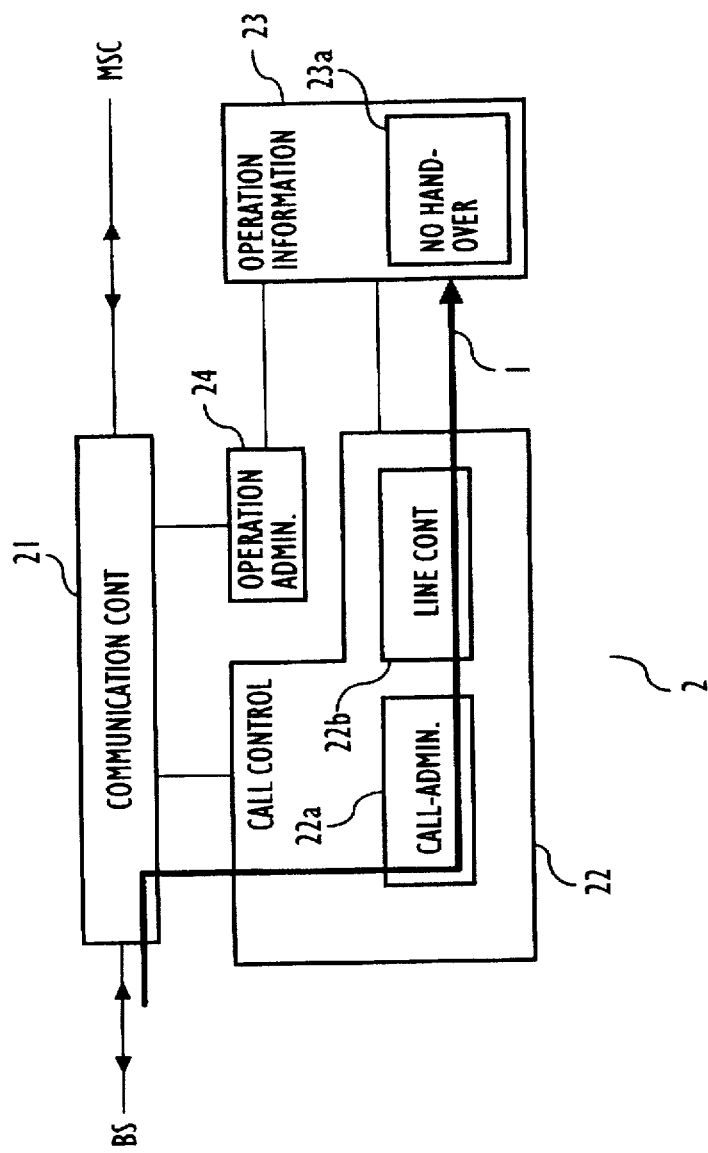
FIG. 3 is a block diagram of a base control station according to the first embodiment of the present invention.

FIG. 3 shows the constitution of the base control station according to the first embodiment of the present invention.

The base control station (BCS) 2 administrates a plurality of mobile base stations and comprises a communication controller 21 for mediating communication information or voice signal, which is transmitted/received between the mobile base station and the mobile service switching center; a call controller 22 having a call administration function 22a and a line controller 22b, an operation information storage 23 for storing operation information relating to the mobile base station and mobile station under control thereof; and an operation administrating portion 24 for performing supervisory and control that relate to the operation of the system. Note that the line controller 22b has, at predetermined intervals, received measured receipt level of the upward radio channel from the busy mobile station to decide that the radio wave has been interrupted in the mobile station and performs a process of disconnecting the line if the received level is lower than a predetermined call-terminating receiving level. The base control station according to the present invention further comprises, in the operation information storage 23 thereof, a hand-over selection information setting area 23a for storing information denoting whether or not the voice channel is switched.

Figure 4:
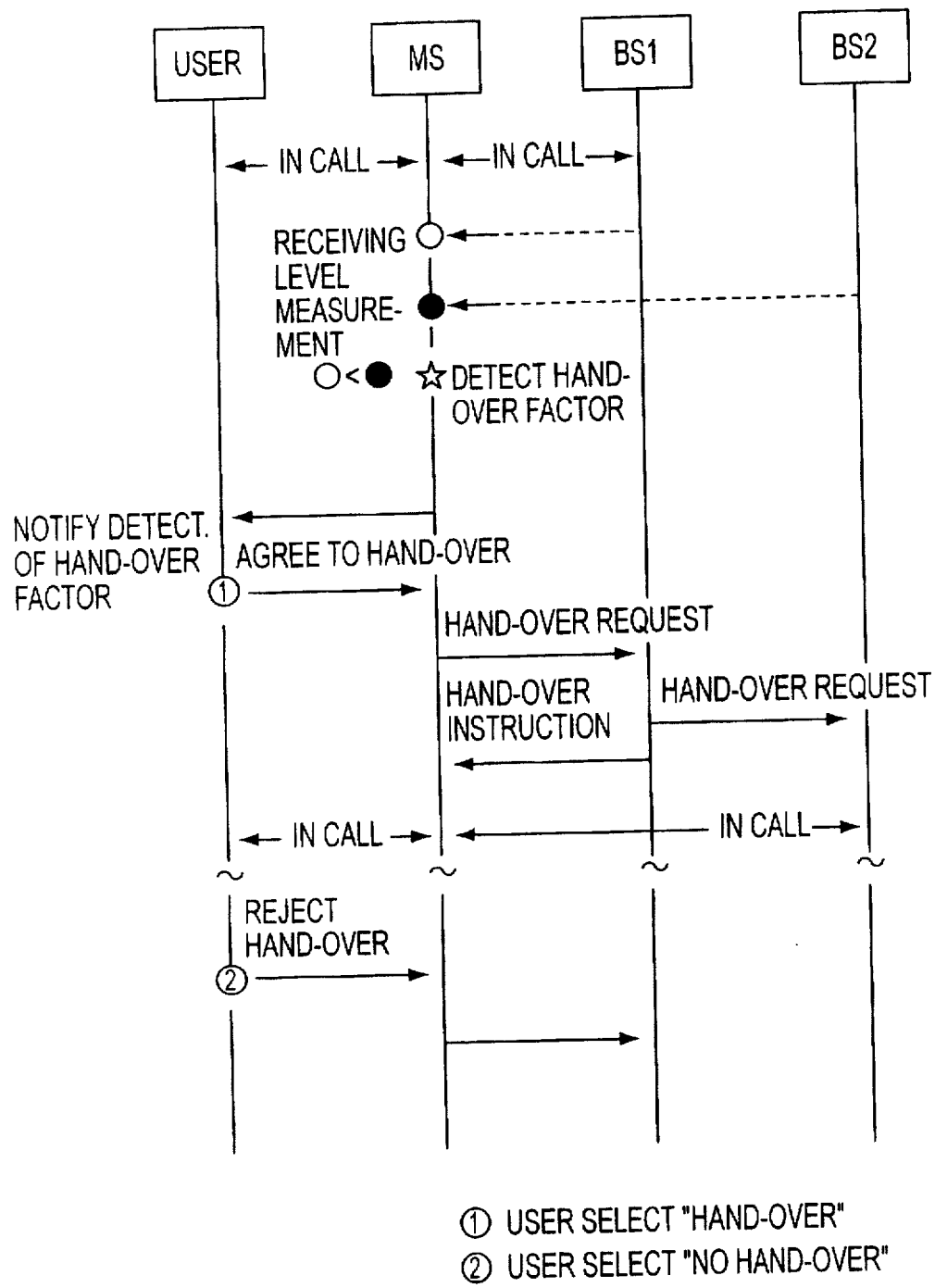
FIG. 4 is a time sequence of a hand-over process caused by the mobile station.

A time sequence shown in FIG. 4 illustrates the operation of the system to be performed in a case where the present invention is applied to a hand-over process being caused by a mobile station (MS) such that fall of the receiving level from the communicating mobile base station, than that of the adjacent mobile base station is detected so as to switch the channel.

As shown in FIG. 4, the mobile station in call (MS) measures the receiving level from the communicating mobile base station (BS1), and measures the receiving level from a mobile base station (MS2), which is an adjacent radio zone, by using a vacant time slot. Information relating to perch channels for supervising the adjacent radio zone has been supplied to the mobile station as radio condition report information.

If the relationship between the receiving level of the calling channel of the mobile base station 1 and the receiving level of the perch channel of the mobile base station is changed as in a predetermined manner, for example, if the receiving level of the mobile base station 1 has been lowered as compared with the result of the previous measurement and as well as the receiving level of the perch channel of the mobile base station 2 has been raised to be higher than that of the mobile base station 1, the mobile station, that has detected this, determines that a factor for hand-over has been generated and, therefore, the mobile station performs as follows.

As shown in FIG. 2, the notification function portion 44d of the call-control function 44b of the mobile station decides that the voice channel must be switched and, as indicated by an arrow 1, notifies the speaker 42a that the voice channel must be changed, the notification being performed through the transmitting/receiving function 44a and the radio receiver 41b. The notification is carried out by producing a trunk tone like a telephone with call-waiting catch continuing for a predetermined time.

The user, who has notified this, operates the hand-over setting switch 43d provided for the man-machine or the like to set whether or not the hand-over is prohibited. As an alternative to this, a constitution can be used such that pushing a specific dial key in the foregoing state enables similar setting to be performed.

The setting information is, as indicated by an arrow 2, notified to the call-control function 44b through the man-machine interface 43 and the status supervisory function 44c.

In a case where channel switching is notified (in a case where the user wants the hand-over), the call-control function 44b transmits a request to hand over the radio channel to the mobile network along the route indicated by an arrow 3, that is, through the transmitting/receiving function 44a, the radio transmitter 41b and the antenna 41a. The request is transmitted in such a manner that the receiving level in the own zone and that in the surround zone are formed into a message of a condition report 2 and the message is transmitted to the network through the own mobile base station. The mobile network switches the voice channel by a conventional procedure.

If the user has select no hand-over, the call-control function 44b stores information "no hand-over" in the variable information storage region 45b of the storage 45. Furthermore, the call-control function 44b forms a message requiring setting of "no hand-over" to transmit this to the mobile network along the route indicated by an arrow 3. It is preferable that the foregoing message be transmitted as "operator peculiar information" disclosed at pp. 191 of RCR 27C: Research & Development Center for Radio System "DIGITAL CELLULAR TELECOMMUNICATION SYSTEM" RCR STD 27C. The mobile base station, which has received the "operator peculiar information" notifies the base control station of the receipt of this.

The base control station receives the "operator peculiar information" through the communication controller 21, the call administrating portion 22a and the line administrating function 22c as indicated by the arrow 1 shown in FIG. 3 to set information "no hand-over" in an area 23a in operation information corresponding to this call, the operation information being stored in the operation information storage for each call. Then, a usual value of the call completion condition receiving level set in the line controller 22b is changed to a lowest level, for example (a receiving level capable of transmitting receiving various control signals for controlling the call).

Then, in a case where a factor for hand-over is again generated in the mobile station performing the subject call, a hand-over process for the same mobile station does not start because information "no hand-over" has been set in the storage 45. Even if a hand-over factor is detected by the line control function of the base control station, no hand-over process is performed because "no hand-over" has been set in the operation information relating the subject call. Since the call completion condition receiving level for the subject call is set to the lowest receiving level which is lower than a usual level, the call state is maintained until upward radio channel from the mobile station is completely interrupted.

The description has been made about the operation to be performed in a case of the method of switching the voice channel due to the detection of the hand-over factor by the mobile station. There is another type of hand-over process that is due to the detection of the hand-over factor by the network. This type of process is carried out in such a manner that if the receiving level of the upward wave supervised by a mobile base station is lower than a predetermined receiving level, then a discrimination is made that a hand-over factor has been generated and the mobile station 4 is caused to report the receiving level of the perch channel of the surrounding zone (called a "radio condition report") to switch the voice channel. In the foregoing case, the foregoing operation is performed in response to a request from the mobile network to report the radio condition to the mobile station so that the intention of the user is reflected.

According to the foregoing embodiment, the user of the mobile station is able to determine whether or not to switch the voice channel considering the state of the call. Therefore, the service quality for users can be improved and the performance of the mobile communication system can be improved.

Figure 5:
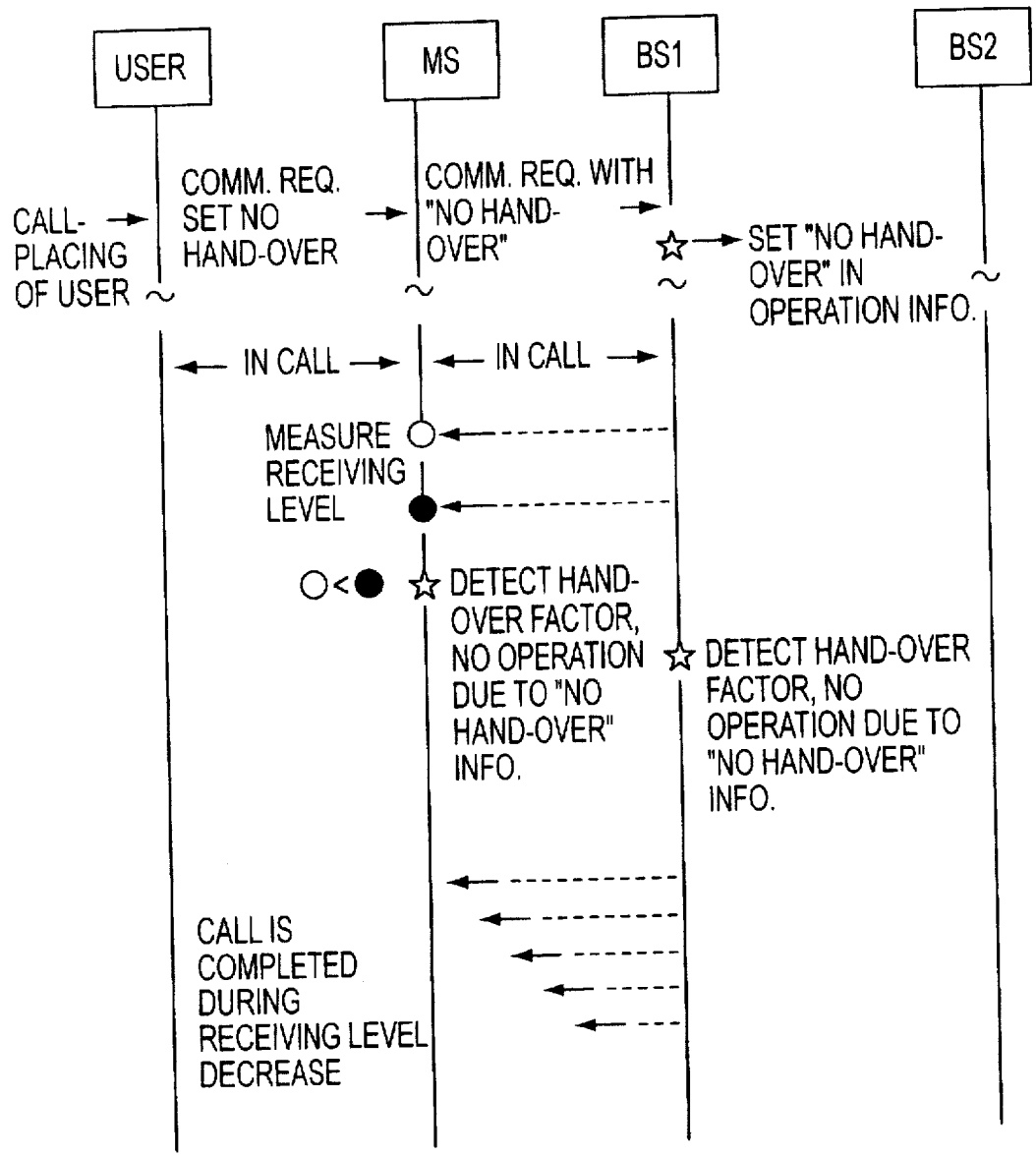
FIG. 5 is a time sequence for setting "no hand-over" at the time of placing a call.

FIG. 5 shows a time sequence according to a second embodiment of the present invention.

In this case, a user sets the hand-over setting switch to the rejection mode prior to placing a call. Thus, "no hand-over" is written in the variable information storage of the mobile station.

Furthermore, information "no hand-over" is added to a call request message (to request the connection of lines) to be transmitted from the mobile station to the mobile network to notify the mobile network that the hand-over is not required. The network sets "no hand-over" to the operation information relating to the subject call. Then, a procedure similar to that of the first embodiment is performed so that hand-over is prevented.

As a result, the user is able to reject switching of the voice channel against user's will.

A third embodiment of the present invention will now be described. This embodiment has an arrangement that, even if a communicating mobile station or a mobile network does not detect a hand-over factor, the voice channel can be switched in accordance with the will of the user of the mobile station.

The conventional hand-over method has an arrangement that a mobile station or a network supervises the receiving level of a communicating radio channel, compares this level with the receiving level of the surrounding zone and if the result of the comparison meets predetermined conditions, then the hand-over operation is performed. Depending upon the method of setting the conditions, even if a radio channel in another radio zone having a better call quality than the communicating radio channel exists, the hand-over is not always carried out. This embodiment enables the hand-over from the communicating radio channel to another radio channel having a better call quality if user wants.

Figure 6:
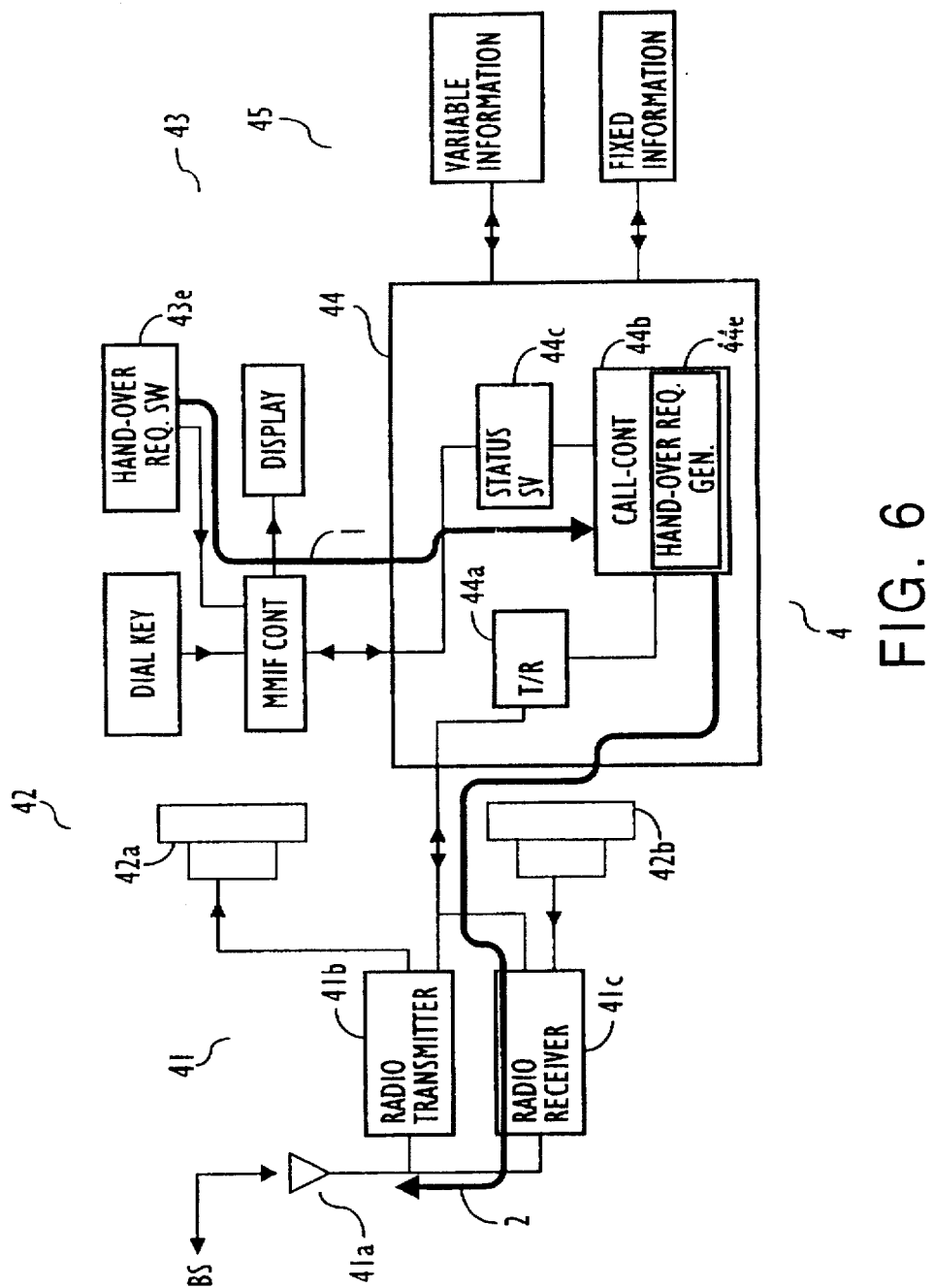
FIG. 6 is a block diagram of a mobile station according to a third embodiment of the present invention.
Figure 7:
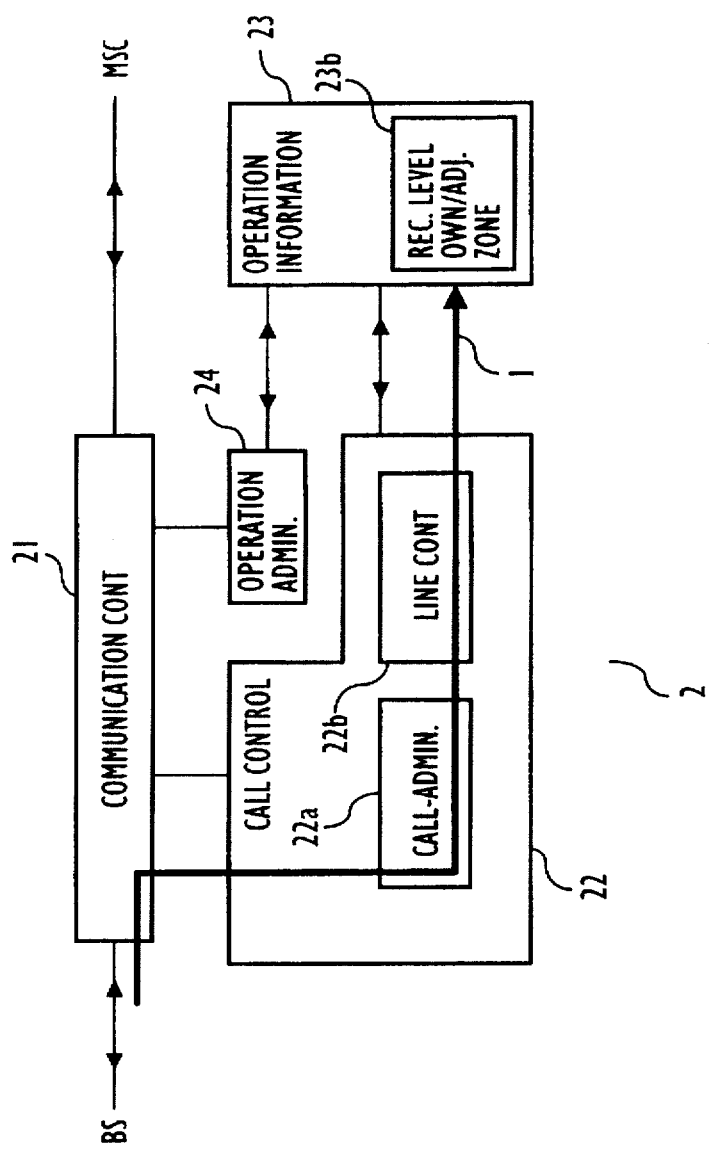
FIG. 7 is a block diagram of a base control station according to the third embodiment of the present invention.
Figure 8:
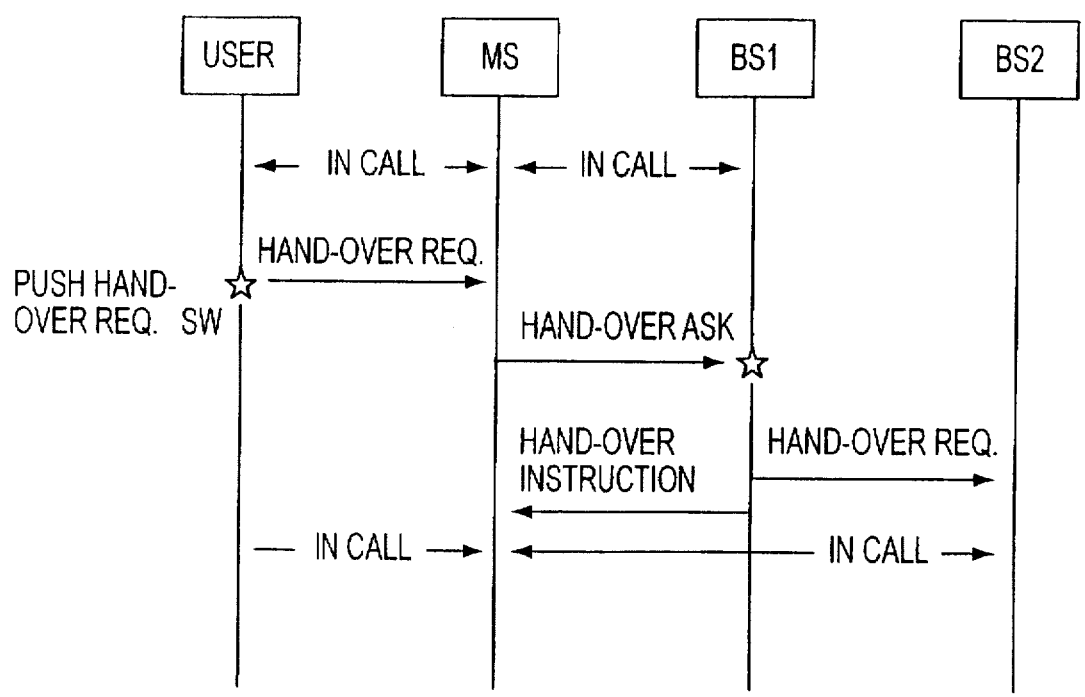
FIG. 8 is a time sequence for hand-over process performed due to a demand from a user.

The constitution of a mobile station according to the third embodiment is shown in FIG. 6, the constitution of a base control station is shown in FIG. 7, a time sequence is shown in FIG. 8, and the configuration of hand-over request information is shown in FIG. 9.

The mobile station comprises, as shown in FIG. 6, a hand over request switch 43e in the man-machine interface and a hand-over request generator 44e in the call-control function 44b.

An assumption is made as shown in FIG. 8 that a user of a mobile station at use requires hand-over due to, for example, deterioration in the call quality. The user depresses the hand-over request switch of the mobile station.

Referring to FIG. 6, when the hand-over request switch 43e is operated by the user, information of the setting is, as indicated by an arrow 1, notified to the call-control function 44b through the man-machine interface portion 43 and the status supervisory function portion 44c. The hand-over request generating 44e of the call-control function 44b edits a hand-over request message for requesting the base control station to switch the channel and transmit the message to the base control station.

The hand-over request message is, similar to the foregoing information "no hand-over", for example, "operator peculiar information" message (refer to pp. 204 of RCR 27C). As shown in FIG. 9, the hand-over request message includes, in the following order, the type of the message indicating the hand-over request, the network No. for identifying the network to which the mobile station belongs, the own-zone receiving level showing the receiving level of the using radio channel, the number of selected zones, which shows the number of adjacent zones to be reported, the perch channel No. showing the highest receiving level among the adjacent zones and its receiving level, the perch channel No. showing the second receiving level and its receiving level, then perch channels of the adjacent zones showing receiving levels higher than a predetermined value being arranged in the descending order.

The mobile station transmits the connected mobile base station through a route indicated by an arrow 2 shown in FIG. 6, that is, through the transmitting/receiving function 44a, the radio transmitter 41b and the antenna 41a. The mobile base station, which has received this, notifies the contents to the base control station. In the base control station, the hand-over request message is received by the line administration function 24b along a route indicated by an arrow 1 shown in FIG. 7, that is, through the communication control function 21 and the call administrating function 22a. The own zone receiving level and the adjacent zone information in the message are used to update the operation information 23b held in the operation information storage 23 and corresponding to the subject call. Then, the line control function 22b refers to the updated operation information to decide whether or not hand-over of the subject call from the current voice channel to the voice channel of the adjacent zone will improve the call quality. If the call quality can be improved, the switching of the voice channel to the adjacent zone is performed.

Thus, the user is able to communicate in a radio zone having a better call quality in accordance with the will.

A fourth embodiment of the present invention will now be described.

Figure 10:
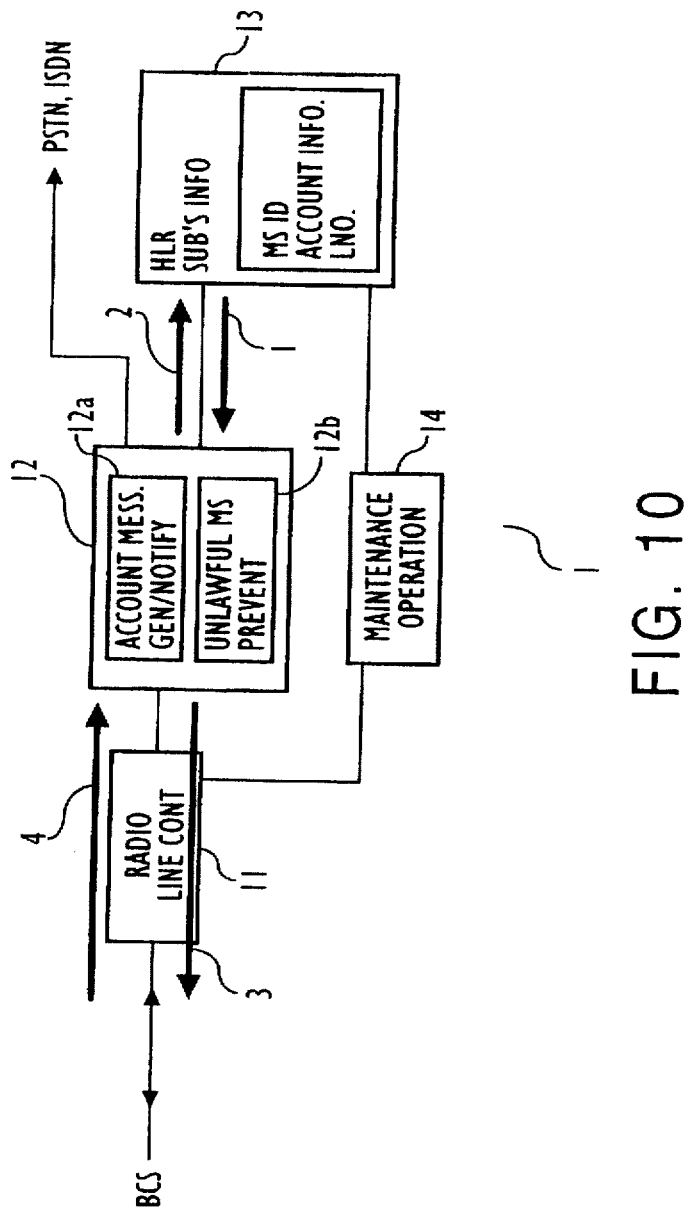
FIG. 10 is a block diagram of a mobile service switching center according to a fourth embodiment of the present invention.

FIG. 10 shows the constitution of a mobile service switching center according to a fourth embodiment of the present invention. In this figure, sections relating to a call control process in the mobile service switching center are shown.

A mobile service switching center 1 comprises a radio line controller 11 for controlling radio lines between the base stations and the mobile stations, via the base control stations, a call controller 12 for controlling the call between another network or another mobile service switching center and a mobile station under control of the own mobile service switching center, a home memory 13 for storing fixed/variable subscriber information relating to all subscribers of the mobile stations registered to the own mobile service switching center, and a maintenance operation function 14 for maintaining the mobile communication system.

To embody the present invention, an account message generating and notifying function 12a and an unlawful station preventing function 12b are provided for the call controller 12.

The home memory HLR (Home Location Register) 13 stores, as fixed information for each mobile station, subscriber's ID and ID of the mobile station, and stores, as variable information, account information corresponding the accumulated charge of the calls for the mobile station from a certain moment and information of subscribers, such as the location No. corresponding to the location area when the location registration is performed at latest the foregoing information being stored for each subscriber.

The account message generating/notifying function 12a takes out accumulated account information of the subject mobile station from the home memory 13 as indicated by the arrow 1 when a call has been completed. The read value and account information of this call are added to calculate the network-calculated accumulated account information and write the calculated account information as new accumulated account information in a subject subscriber's region in the home memory 13 as indicated by an arrow 2. Then, it generate account notification message including the new accumulated account information and call account information corresponding to the current call to notify the subject mobile station through the radio line controller 11 as indicated by an arrow 3. When the unlawful station preventing function 12b receives an unlawful MS notifying message from the mobile station as indicated by an arrow 3, information showing an occurrence of unlawfulness in the region in the home memory 13 for the mobile station and then ensuing call service for the mobile station having the subject ID is rejected.

Figure 11:
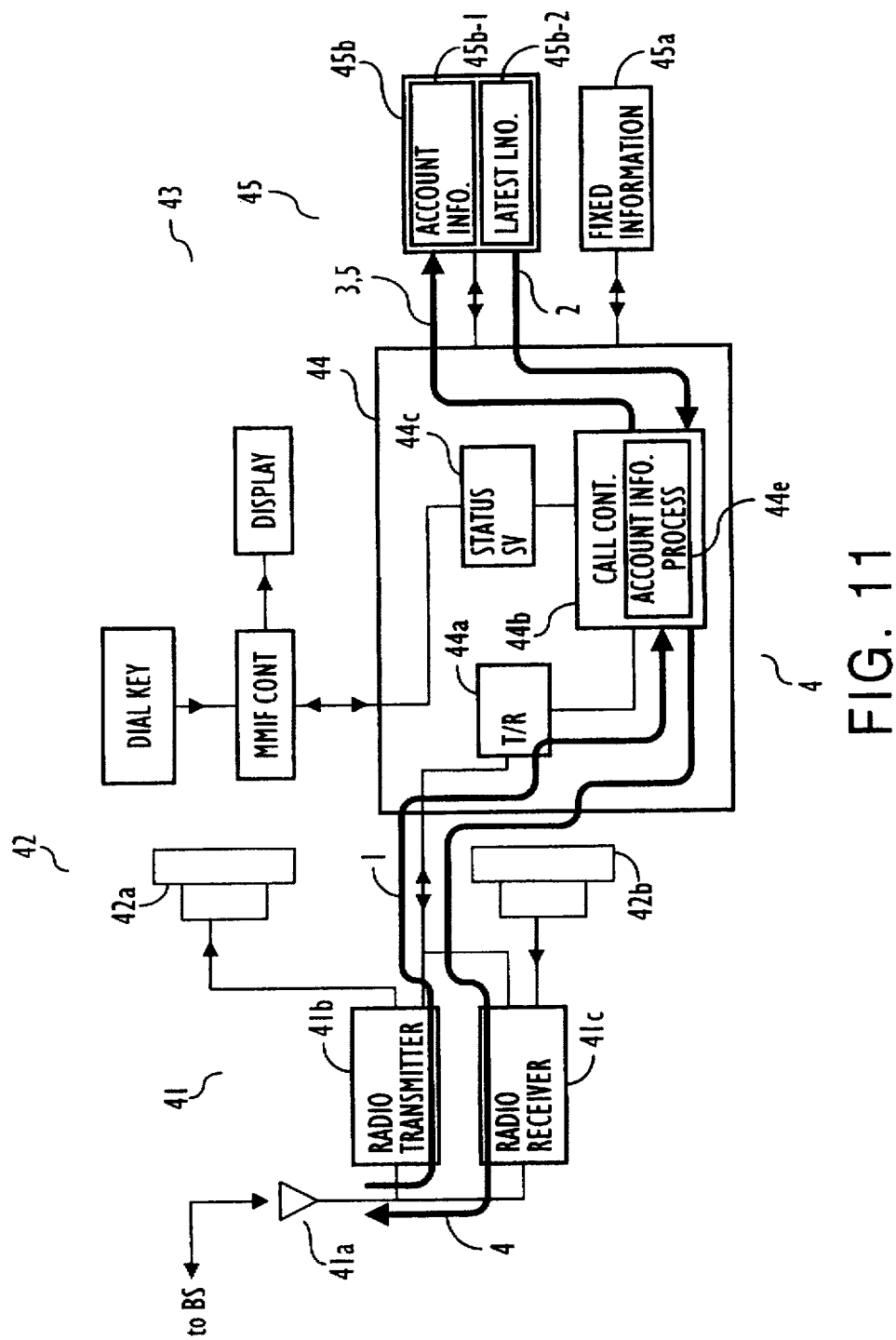
FIG. 11 is a block diagram of a mobile station according to a fourth embodiment of the present invention.

FIG. 11 shows the constitution of a mobile station according to a fourth embodiment of the present invention. According to this embodiment, the mobile station shown in FIG. 2 further comprises, in the variable information storage portion 45b thereof, an account information storage area 45b-1 for storing account information and, in the call-control function 44b thereof, an account information processing function 44d for receiving the foregoing account notification message notified from the network whenever a call is completed to subject the message to a predetermined process. As indicated by an arrow 1 shown in FIG. 11, the account information processing portion 44d receives account notification message from the network through the radio receiving portion 41b and the transmitting/receiving function portion 44a when a call made by the own station has been completed. As indicated by an arrow 2, the accumulated account information to the previous call stored in the variable information storage 45b is read out and the account information charged to current call is added to the foregoing value so as to calculate the accumulated call charge calculated by the own station. As indicated by an arrow 3, the accumulated account information in the variable information storage 45b is updated to the calculated value. Furthermore, the updated value and the accumulated account information notified by the network including the current call are compared. If the result of the comparison does not coincide, an unlawful MS notifying message is constituted to be notified to the network through the transmitting/receiving function 44a and the radio transmitter 41c as indicated by an arrow 4.

FIG. 12 shows the configuration of the unlawful MS notifying message.

This message comprises the type of the message showing the unlawful MS notifying message, the network No. for identifying the network to which the subject mobile station belongs, the data length and its value of the MS-calculated accumulated call charge independently calculated by the mobile station, and the data length and its value of the accumulated call charge calculated by the network and notified from the network at this time.

The unlawful MS notifying message is transmitted to the mobile service switching center through the mobile base station. As indicated by an arrow 4 shown in FIG. 10, the unlawful MS preventing function 12b of the mobile service switching center receives the unlawful MS notifying message through the radio line controller 11. As indicated by an arrow 5, the unlawful MS preventing function 12b writes information that an unlawful mobile station exists in the subscriber information in the home memory 13 corresponding to the subject mobile station.

FIG. 13 shows an example of the configuration of the information of the subscriber. The information of the subscriber comprises areas for the ID of the mobile station, the telephone number, account information, information of registered location and unlawful information. In the area for the unlawful information, for example, "00" corresponding to "no unlawful MS exists" is rewritten to "01" corresponding to "unlawful MS exists". When an ensuing call service of the mobile station having the subject ID is requested, reference is made to the area for the unlawful information. If an unlawful MS exists, hereinafter the receipt of the service request is rejected.

Figure 14:
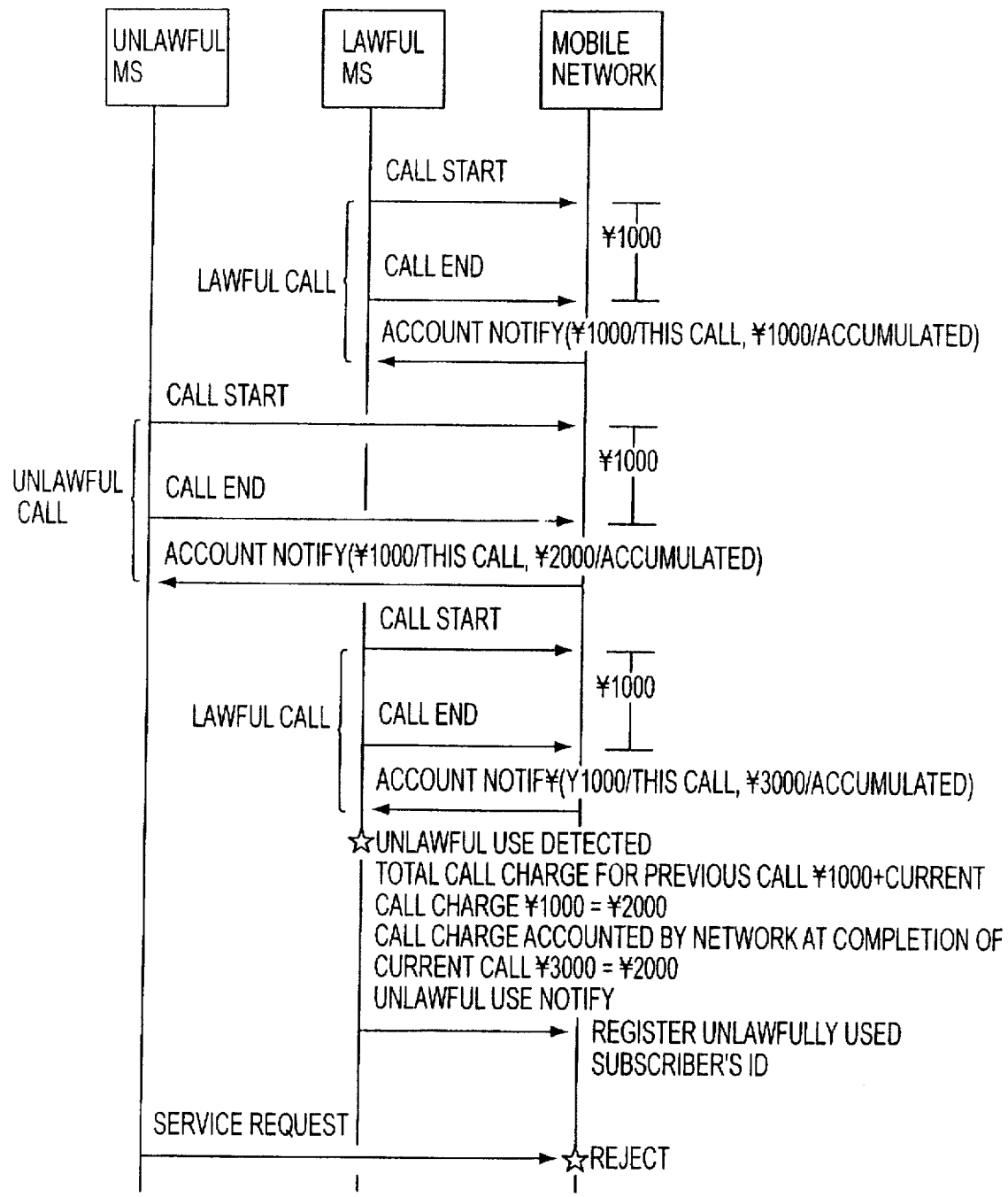
FIG. 14 is a time sequence for detecting unlawful mobile station on the basis of charge account information.

A time sequence of the operation for finding an unlawful mobile station for use in the thus-constituted mobile communication system is shown in FIG. 14.

FIG. 14 shows a time sequence of a case in which a first call of a lawful mobile station, the charge of which is 1.000 yen, is made and an unlawful call, the charge of which is 1,000 yen, is performed by an unlawful mobile station. The lawful mobile station receives a notification from the mobile network that the accumulated call charge is 3,000 yen when the second call has been completed. However, the accumulated call charge stored in the lawful mobile station is 2,000 yen. Therefore, the lawful mobile station recognizes unlawful use and notifies this to the mobile network. The mobile network rejects all of ensuing service requests from the mobile stations having the subject subscriber's ID.

Figure 15:
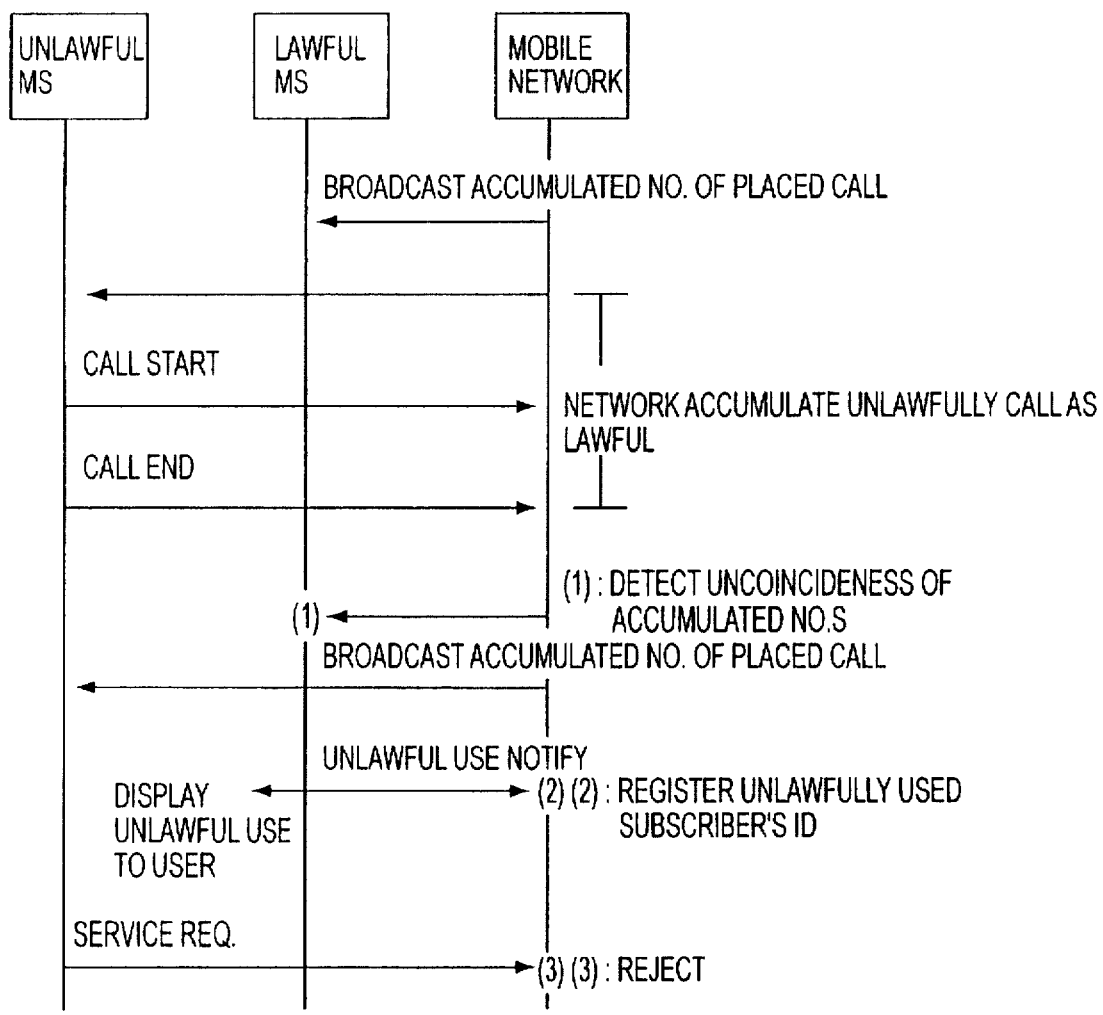
FIG. 15 is a time sequence for detecting unlawful mobile station on the basis of the number of call placing by mobile station.
Figure 16:
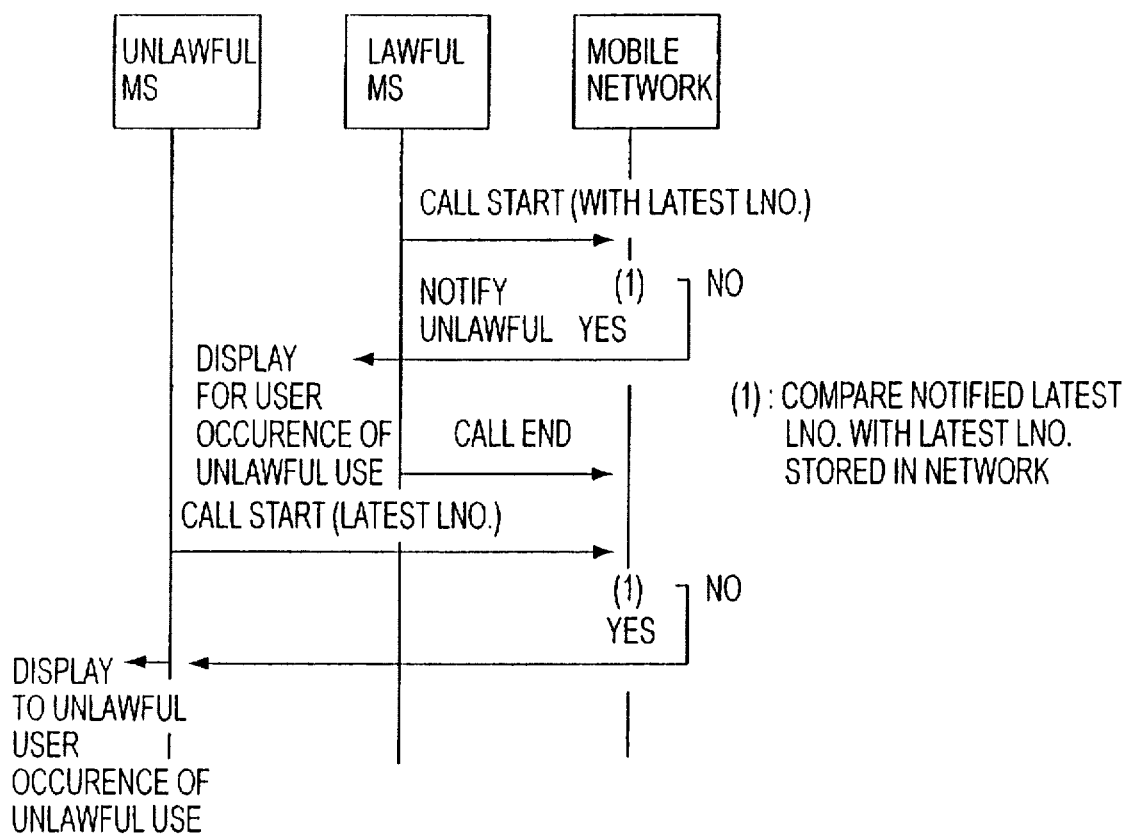
FIG. 16 is a time sequence for detecting unlawful mobile station on the basis of the final location No.

An embodiment of a method of preventing unlawfulness will now be described with reference to FIG. 15 in which the number of call placing from a mobile station is used.

In this case, information of a subscriber in the home memory of the mobile service switching center is provided with a region for storing the accumulated number of call placing from the mobile station having the subject ID from a predetermined moment; and the accumulated number is updated whenever a call is received.

The mobile network, in the variable information storage thereof, independently accumulates the number of calls therefrom after a predetermined moment and the accumulated results is stored in the variable information storage of the home memory. The mobile network notify periodically the accumulated number to the mobile station by using broadcast channel.

Then, the mobile station recognizes the number of placed calls made therefrom via the broadcast channel (1 of FIG. 15), and compares the received number and the number which has been accumulated by itself. If they do not coincide with each other, the unlawful MS notifying message is generated and it is notified to the network. Furthermore, this is notified also to a user of the mobile station by a predetermined method. When the network receives the notification, it registers the No. of the subject subscriber, the information of the subscriber of the subject mobile station and service rejection information (2), and ensuing service is rejected (3).

In usual, the mobile station stores, in the variable information storage thereof, the location No. at the final (latest) location registration. When the mobile station become powered on moved to another radio zone, the location No. of the radio zone is received through a notifying (broadcast) channel from the mobile base station of that zone in which the mobile station is exist. In a case where the mobile station has been moved to a location area, which is different from that in which the mobile station has finally registered its location, the received location No. and the stored latest location No. are different from each other. Therefore, location registration is performed. On the other hand, the mobile network, in the home memory thereof, stores the final location No. of the subject mobile station to correspond to the ID of the mobile station.

In this embodiment, the mobile station is provided with a latest location No. notifying function for notifying, to the mobile network, the latest location No. stored in the latest location storage means when a call is made. The call controller of the mobile service switching center is provided with a location No. comparison function. The location No. comparison function compares the final location No. notified from the mobile station at the receipt of a call and the latest location No. corresponding to the ID of the subject mobile station. If they do not coincide with each other as a result of the comparison, the communication service for the mobile station having the subject ID is rejected by the foregoing method.

In a case where the unlawful mobile station notifies the latest location thereof which is different from the latest location of the lawful mobile station when the unlawful mobile station makes a call, unlawful use is notified to the unlawful mobile station and the receipt of the communication service is rejected. In a case where the final location No. notified from the lawful mobile station to the network at the time of a call is different from the location No. of the unlawful mobile station which has made a previous call, the lawful mobile station is notified from the network that unlawful use has been performed.

According to the foregoing present invention, unlawful use of the mobile communication service by an unlawful mobile station can be prevented, and the amount of loss for the service and incorrect account for a lawful mobile station can be minimized. As a result, the service quality and reliability of the mobile communication system can be improved.

Referring to FIGS. 17 to 29, it will now be described that a method for improving the congestion in call control processing in the base control station according to a sixth embodiment of the present invention. This method is achieved by reducing the number of mobile base stations which is under control of the congested base control station.

Figure 1:
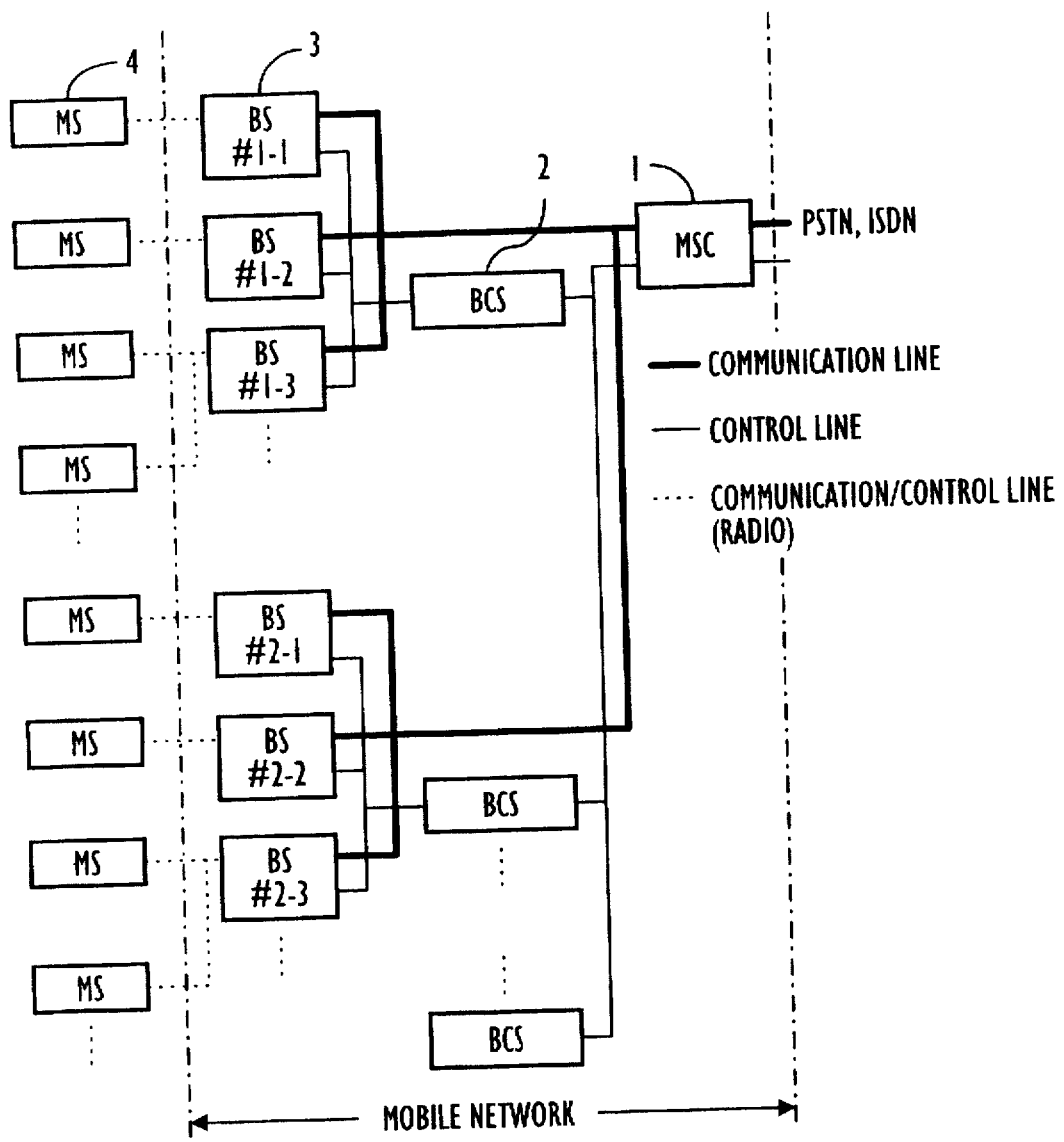
FIG. 1 is the system constitution of a mobile communication system according to which the present invention is applied.

FIG. 1 shows the example of the configuration of base stations and base control stations, in which configuration the base control station #1 and #2 control a mobile base stations group consisting of #1-1, #1-2 and #1-3 and a mobile base station group consisting of #2-1, #2-2 and #2-3, respectively. Although each base control station is directly connected to the corresponding mobile base stations through control lines through which control information is transmitted and received, the base control station cannot control mobile base stations which are not under control.

To embody the present invention, a constitution is employed in which if the base control station is brought to a congested state, control of a portion of mobile base stations under control thereof is consigned to another base control station. In order to realize this, a control line must be connected between the mobile base station to be consigned and the newly assigned base control station to enable control signals to be transmitted and received.

Figure 17:
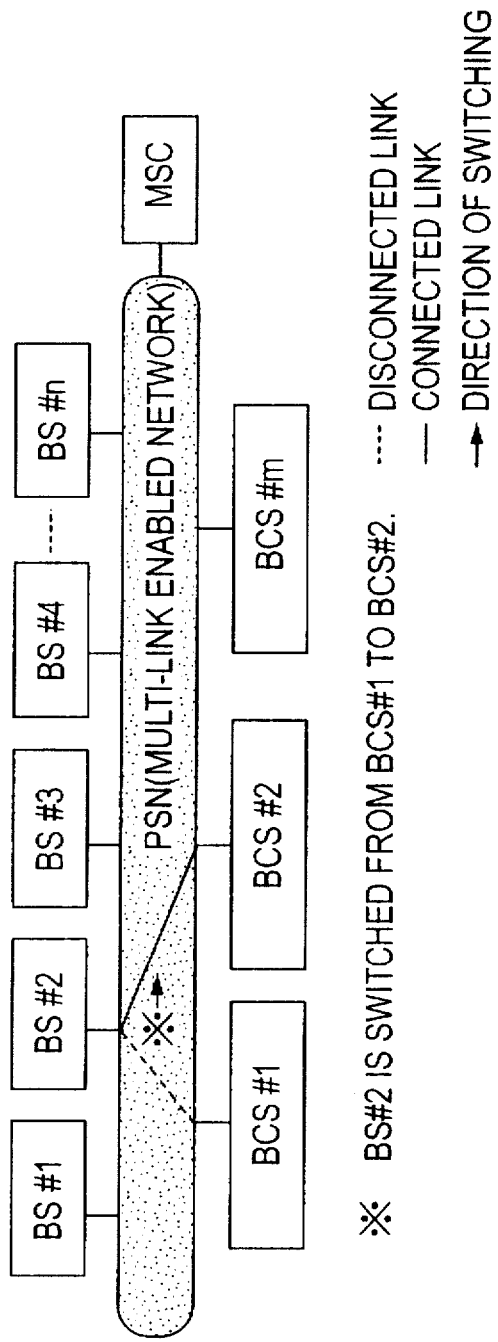
FIG. 17 shows the connection in a multi-linking network between the mobile base station and base control station.

Therefore, a constitution is employed in which the mobile base stations and the base control stations are connected to one another by a network connected by a packet communication network capable of multilinking. FIG. 17 shows a network capable of multilinking in which mobile base stations and base control station are connected to one another. Referring to FIG. 17, a multilinking-enabled packet communication network is used to form the control lines among n mobile base stations #1 to #n and m base control station #1 to #m, thus, enabling any mutual connections. As a result, an arbitrary base control station #1 and an arbitrary mobile base station #2 can be connected and released (separated). Referring to FIG. 17, a control line connecting the mobile base station #2 to the base control station #1 is switched to establish the connection with the base control station #2 so that the mobile base station #2 is switched from being under control of the base control station #1 to the under control of the base control station #2.

The control signal from the mobile base station or that to the mobile base station is formed into a packet having the address of the destination station added to the header portion thereof, the signal being transmitted to the packet communication network to the destination station.

Figure 18:
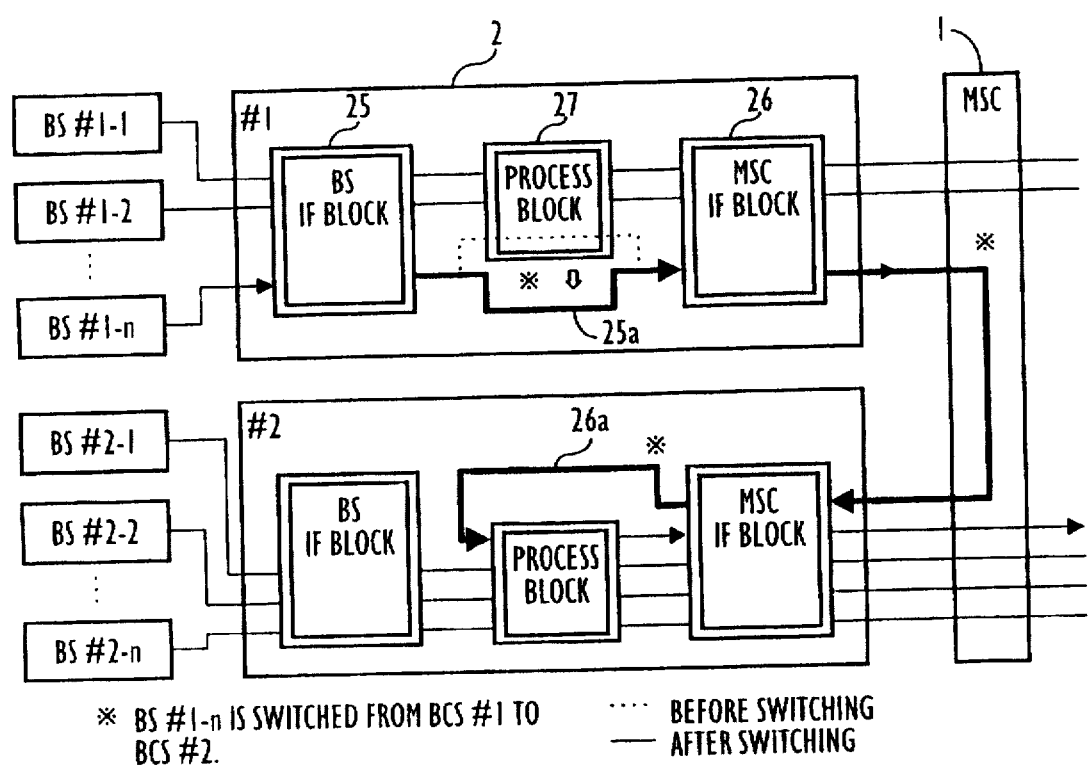
FIG. 18 shows the connection by direct connection lines between the mobile base station and base control station.

FIG. 18 shows the configuration of a case where the present invention is applied to a system in which mobile base stations are connected to one base control station for administrating the mobile base stations through only one direct control line. FIG. 18 shows a system comprising a first group consisting of mobile base stations #1-1 to #1-n and base control station #1 and a second group consisting of mobile base stations #2-1 to #2-n and base control station #2. Each mobile base station is connected to the base control station in the group through a direct control line. In the system having the foregoing connection constitution, control of an arbitrary mobile base station #1-n in a group by another base control station #2 in another group is enabled by constituting the base control station as follows. Each base control station 2 comprises a mobile base station interface block (BS IF BLOCK) 25 for transmitting/receiving a control signal to and from the controlled mobile base stations, a switching station interface block (MSC IF BLOCK) 26 for transmitting/receiving a control signal to and from the mobile service switching center, and a processing block 27 for processing of controlling the mobile base station. Furthermore, the two interface blocks 25 and 27 are provided with an interface function 25a, which enables a control signal to be transmitted and received to and from the controlled mobile base station to be directly transmitted/received to and from the switching station interface block without the processing block 27, and an interface function 27a for inputting the controlling signal to be transmitted/received to and from the mobile service switching center 1 to the processing block 27 similarly to the control signal to be transmitted/received to and from the mobile base station. In an example case where the mobile base station #1-n is separated from the control of the first group and it is controlled by the base control station in the second group, the control signal to be transmitted/received to and from the mobile base station #1-n is not transmitted to the processing block of the corresponding base control station #1 but the control signal is transmitted to the processing block of the base control station #2 in the second group through the mobile service switching center 1.

Figure 19:
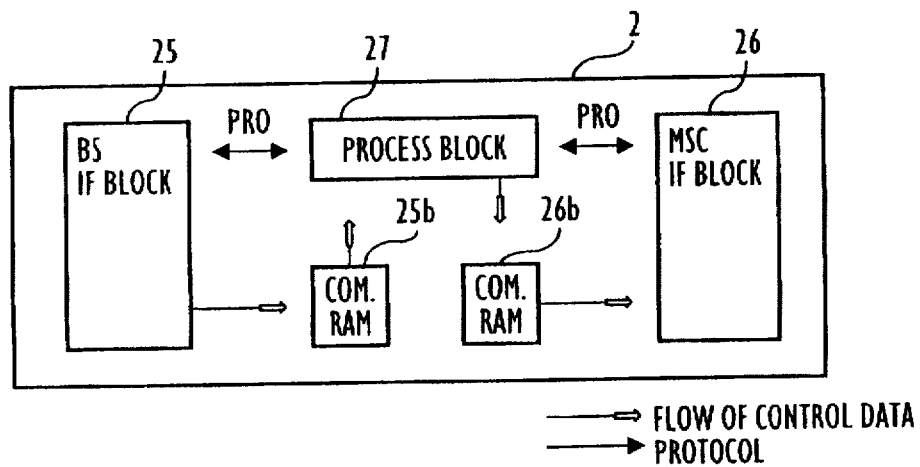
FIG. 19 shows the detailed constitution of the base control station.

The constitution of the base control station to be used in the foregoing direct connection method will now be described further in detail with reference to FIG. 19. The base control station comprises a mobile base station interface block 25 for interfacing controlled mobile base station (not shown), a switching station interface block 26 for interfacing a switching station and a processing block for executing control process for the mobile base station. The interface blocks 25 and 26 have corresponding common memories 25b and 26b to which access can be made from the processing block 27 so that the control signal is transmitted/received through the common memories 25b and 26b. The control block 27 and the two interface block directly transmit/receive processing and communication protocols for transmitting/receiving the control signal individually from the flow of the control signal (data).

The processing block 27 does not perform the call control process of the control signal from the separated mobile base station. However, the processing block 27 has known the address of the consigned base control station to which control of the mobile base station is consigned. Therefore, the processing block 27 only performs a process of temporarily receiving a control signal from the mobile base station interface block 25 and a process of changing the address of the destination for the control signal to that of the consigned base control station to transmit it to the switching station interface block 26. As a result, the load for the processing block 27 can be reduced by a degree of omitting the call control process for the received control signal.

The base control station, to which the control of the separated mobile base station is consigned, usually receives a signal of the controlled mobile base station from the mobile base station interface block 25. In a case where the control of a mobile base station under control of another base control station is consigned, the base control station receives the control signal from the switching station interface block 26.

Figure 20:
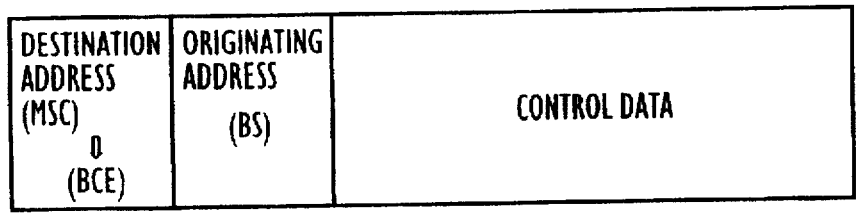
FIG. 20 shows the structure of the transmission control signal.

FIG. 20 shows the configuration of the control signal to be transmitted from the mobile base station. The mobile base station to be separated transmits the destination address of the control signal as the mobile service switching center or the base control station for controlling the own station. The base control station, in which the process is congested, changes the destination address of the received control signal to the address of the consigned base control station before it is transmitted. Since the consigned base control station decides the originating base station in accordance with the originating address in the received signal, the call control process can be performed normally even if the control signal is supplied through the switching station interface block 27.

The following items are further necessary in order to embody the present invention that the base control station is able to separate the controlled mobile base station and brought the same under control of another base control station:

(i) Detecting the load of the control process for processing the call at the base control station; and (ii) An algorism for selecting a mobile base station to be separated.

(i) Detection of the Load for Call Processing (1) Detection Method by Calculating Operation Rate of CPU In the processing block of the base control station, a CPU system executes the call control process by a multitask method. The multitask method uses an OS (operating system) for controlling scheduling each task and interruption or a function equivalent to the OS. In this system, the time in which application program AP runs is measured. Then, a task having a lowest task priority is prepared and caused to be operated always by a self-activation method (the task activates itself) or the like. The self-activation task is called an idle task. The idle task is made by a command NOP (Non Operation), which is a non-operation command of an assembler. After a predetermined processing time has passed, the idle task is again self-activated and stopped. The OS measures the running time for the task having a right of execution at the time of scheduling the task. As a result of execution of the foregoing process for a predetermined time, the task running time for the idle task is the time in which the base control station does not perform the process for call processing and, therefore, the operating rate of the CPU can be calculated by the following equation:

Operation rate of CPU (%)=(Overall Time−Idle Task Running Time−Time Required by OS)/Overall Time×100

If the thus-obtained operating rate of the CPU is higher than a predetermined value (upper threshold), a decision is made that the process is congested. If the ratio is lower than another predetermined value (lower threshold), the congestion has been released. However, the upper threshold must be larger than the lower threshold in order to hysteresis to be provided between the switching operation and the releasing operation according to the decision.

Figure 21:
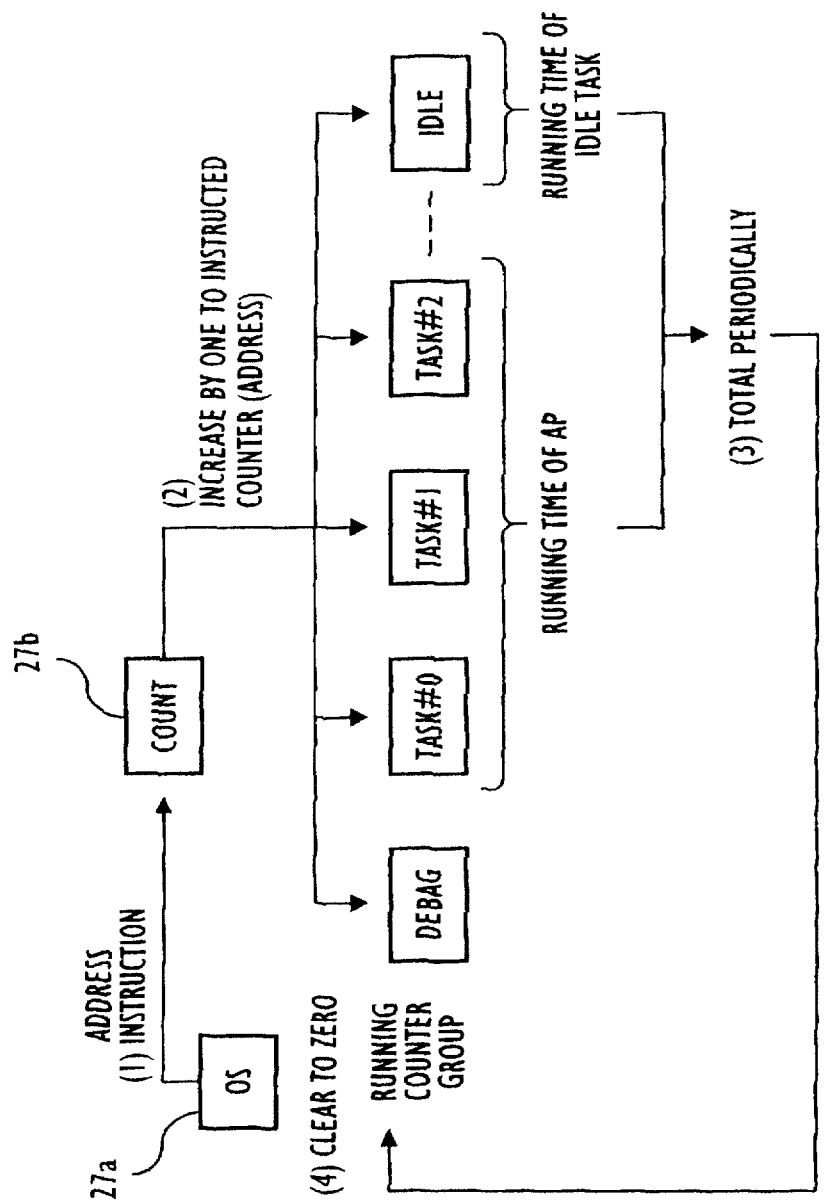
FIG. 21 is a diagram showing a method of operating rate a CPU in the base control station.

FIG. 21 shows in detail the method using the operating rate of CPU in the base control station.

A task scheduler (a counter) 27b that is operated in accordance with address instruction (1) from the OS 27a periodically increases the memory address of the task by one (2). That is, the stored value of the instructed address (the count in running counters) is increased by one. A CPU operation rate calculator of the AP (Application Program), at predetermined intervals of a periodic timer, reads the running time of the AP process for all tasks (task #0, task #1, task #3, ... ) and totals them (3), and the totaled value is zero cleared (4). If the processing block is not performing a process for AP, the idle task is operated. Therefore, the running time of the idle task is the idle time for the processor. Since the operation time for the OS is a small value, which can be neglected, if the load of the task is heavy, the predetermined periodic time for the periodic time is the sum of the running time of a debugger, that of each task and the idle running time. Therefore, the operating rate (%) of the CPU, which is the ratio of the control processing time with respect to the overall time is calculated by the following equation:

Operating rate of CPU (%)=(Periodic Time of Timer−Running Time of Idle Task)/Periodic Time of Timer×100

(2) Detection Method Using Operating rate of Receiver Buffer

Assuming that the base control station cannot complete the process if received signals are concentrated in a short time, a receiver buffer for temporarily storing received control signals to the base control station is provided; and the degree of accumulation of the received control signals in the receiving buffer is used to detect state of congestion. The state in which the process is performed without accumulation of received signals in the receiving buffer is not in congestion. Even if received control signals are accumulated, no problem arises in a case where the quantity of accumulation in the buffer is relatively small and the congestion is overcome immediately. A case where enlargement in the quantity of received control signals exceeds a predetermined time and a case where the quantity of accumulation in the receiving buffer exceeds a predetermined value are decided that the base control station is at the congestion state. The recovery to a normal state is decided such that the quantity is become smaller than another predetermined value is decided as suspension of the process congestion. Note that the relationship (the upper threshold for decide congestion)>(the lower threshold for decide release of congestion).

(ii) Selection of Mobile Base Station to be Separated

The base control station selects the mobile base station to be separated when the state of congestion is detected by the foregoing detection method.

When the process congestion is detected, the foregoing measured load value is used to selected the mobile base station to be separated. The selection method will now be described.

Figure 22:
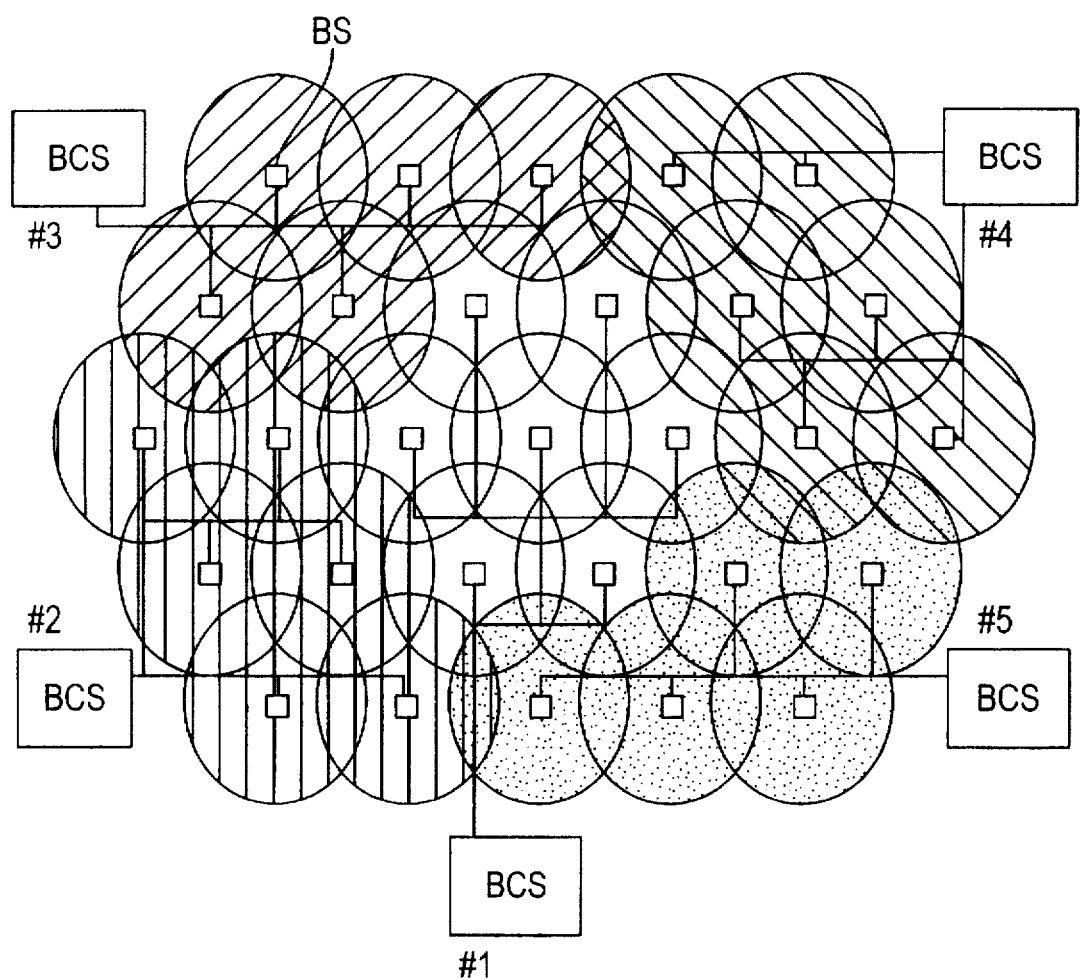
FIG. 22 shows the configuration of the mobile base stations and base control station.

FIG. 22 shows an example of configuration of mobile base stations and base control stations. Referring to FIG. 22, the radio zone of each mobile base station is indicated by one circle and the BS (Base Station) constituting the radio zone is indicated by black square. The base stations BS are connected to corresponding base control station #1 to #5 that control the base stations BS through control lines. Each base control station #1 to #5 control a plurality of base stations BS disposed adjacently. In a case where the base control station performs such a control process related to a plurality of radio zones such as hand-over control, communication for control between the base control station is not required if the plural base stations are under control of the same base control station. Therefore, the load for processing at the base control station is not so heavy.

Figure 23A:
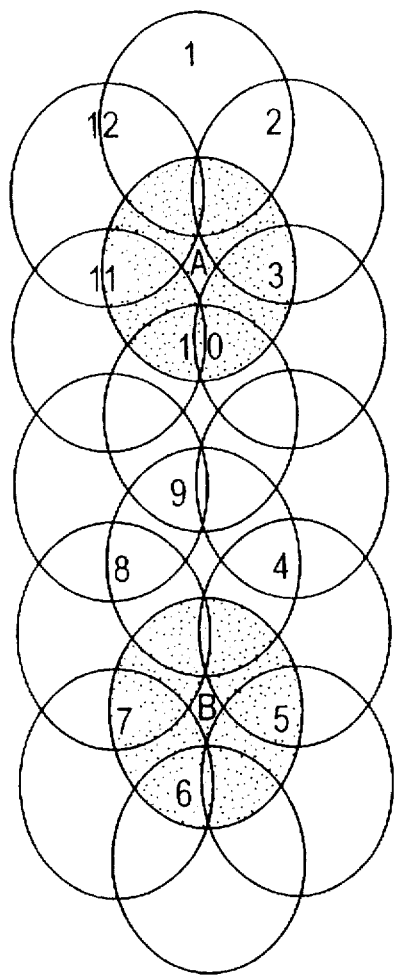
FIG. 23A shows the configuration of radio zones administrated by the base control station.
Figure 23B:
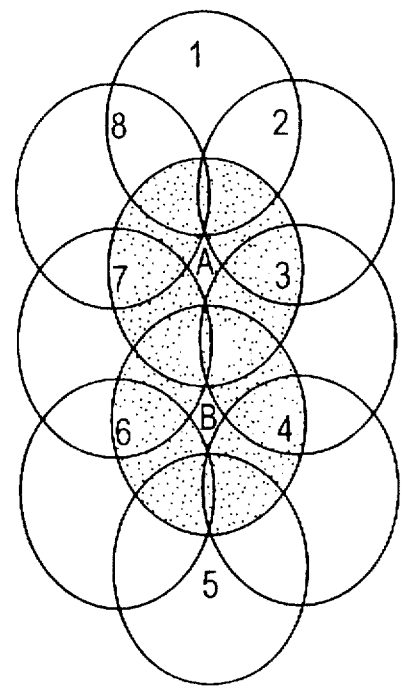
FIG. 23B shows the configuration of radio zones administrated by the base control station.

FIG. 23A and FIG. 23B show the arrangement of two radio zones under control of one base control station. The two radio zones A and B are controlled by one base control station. Wireless zones indicated by numerals 1 to 12 shown in FIG. 23A and radio zones without no mark shown in FIG. 23B are under control of another base control station. In the configuration of the radio zones shown in FIG. 23A, the radio zones A and B, which are controlled by the same base control station, are separated from each other. The number of the base stations BS adjacent to the foregoing radio zones and controlled by another base control station is 12. If two neighboring radio zones are selected as A and B as shown in FIG. 23B, the number of radio zones adjacent to the A and B radio zones and controlled by another base control station is decreased to 8. Thus, the control processing performed across two base control stations can be reduced as compared with the configuration shown in FIG. 23A. Therefore, it is preferable that assignment of the base stations to the base control station be performed such that base stations having adjacent radio zones are controlled by the same base control station.

The base stations to be assigned to the base control station must be set such that each of their radio zones is not separated by the radio zone of a base station controlled by another base control station or the radio zone does not include the radio zone of the other base control station. That is, each of their radio zones must cover a closed administration area.

Figure 24:
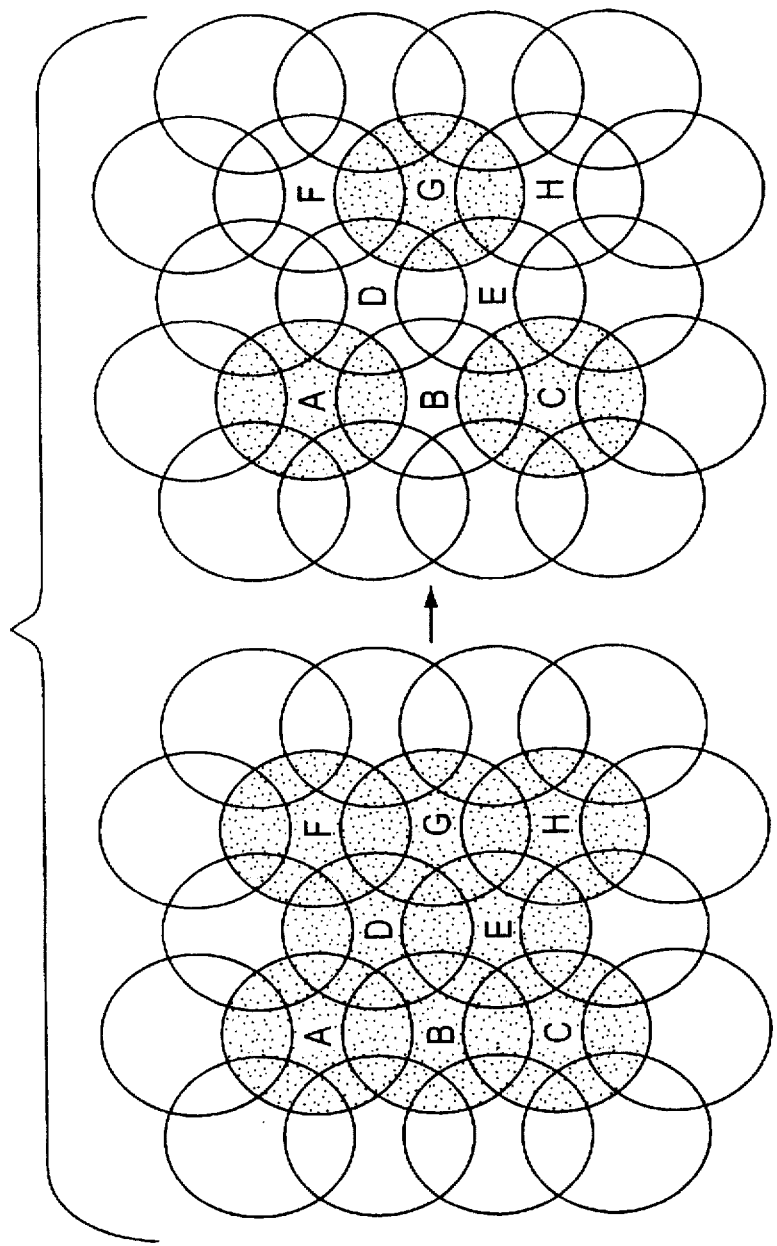
FIG. 24 is a view for explaining a case where the administration area become divided due to separation of an adjacent mobile base station.
Figure 25:
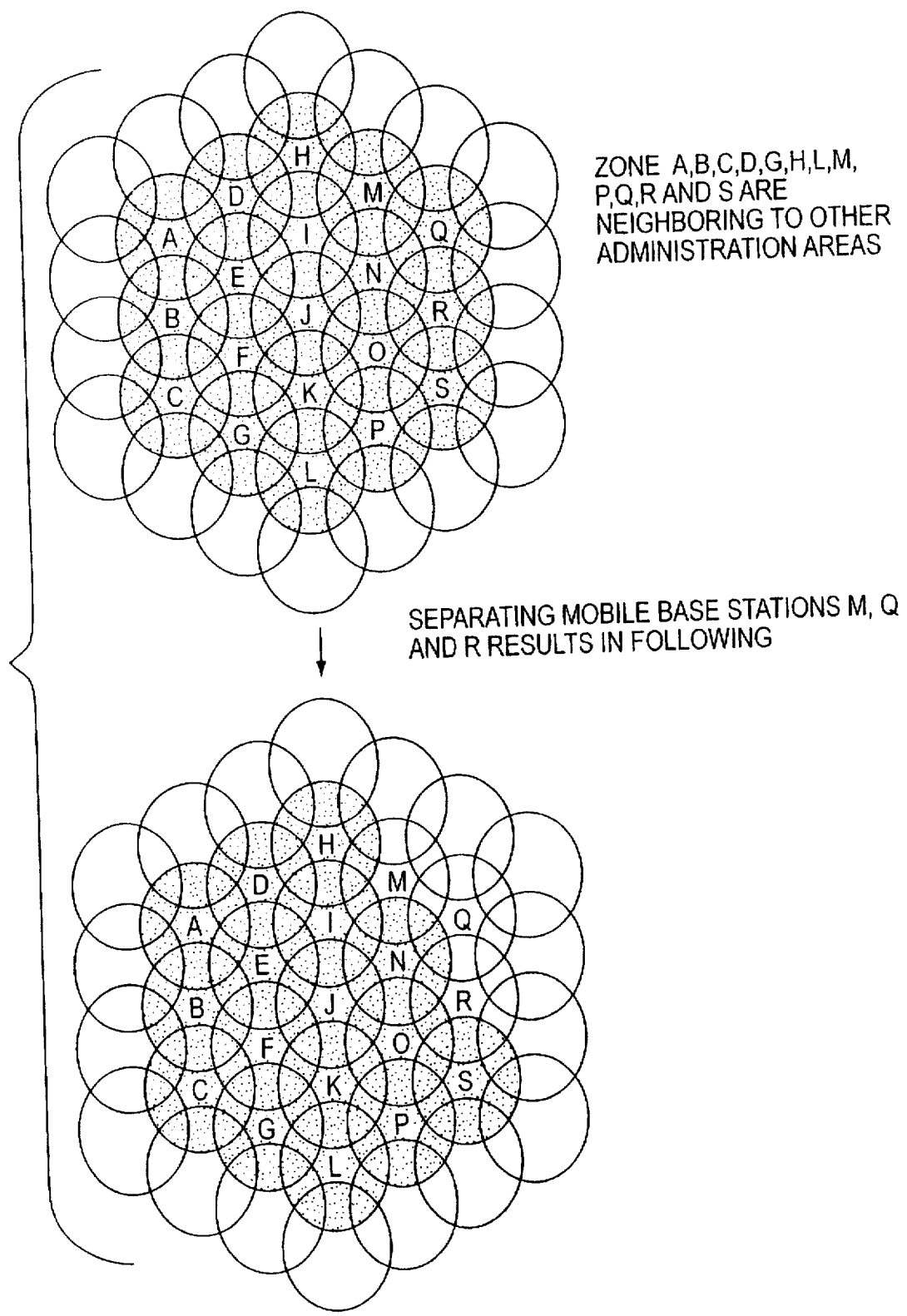
FIG. 25 is a view for explaining separation of adjacent mobile base station, without dividing the administration area.

When the base control station separates a certain base station from the control thereof to consign the control to another base control station, random separation sometimes results in impossibility of presence of an administration area. FIG. 24 shows the foregoing case in which if base stations B, D, E, F and H are decided to be separated in accordance to measured processing load, then, the administration area is not formed into a closed area but the same is divided into two separated areas.

Figure 26:
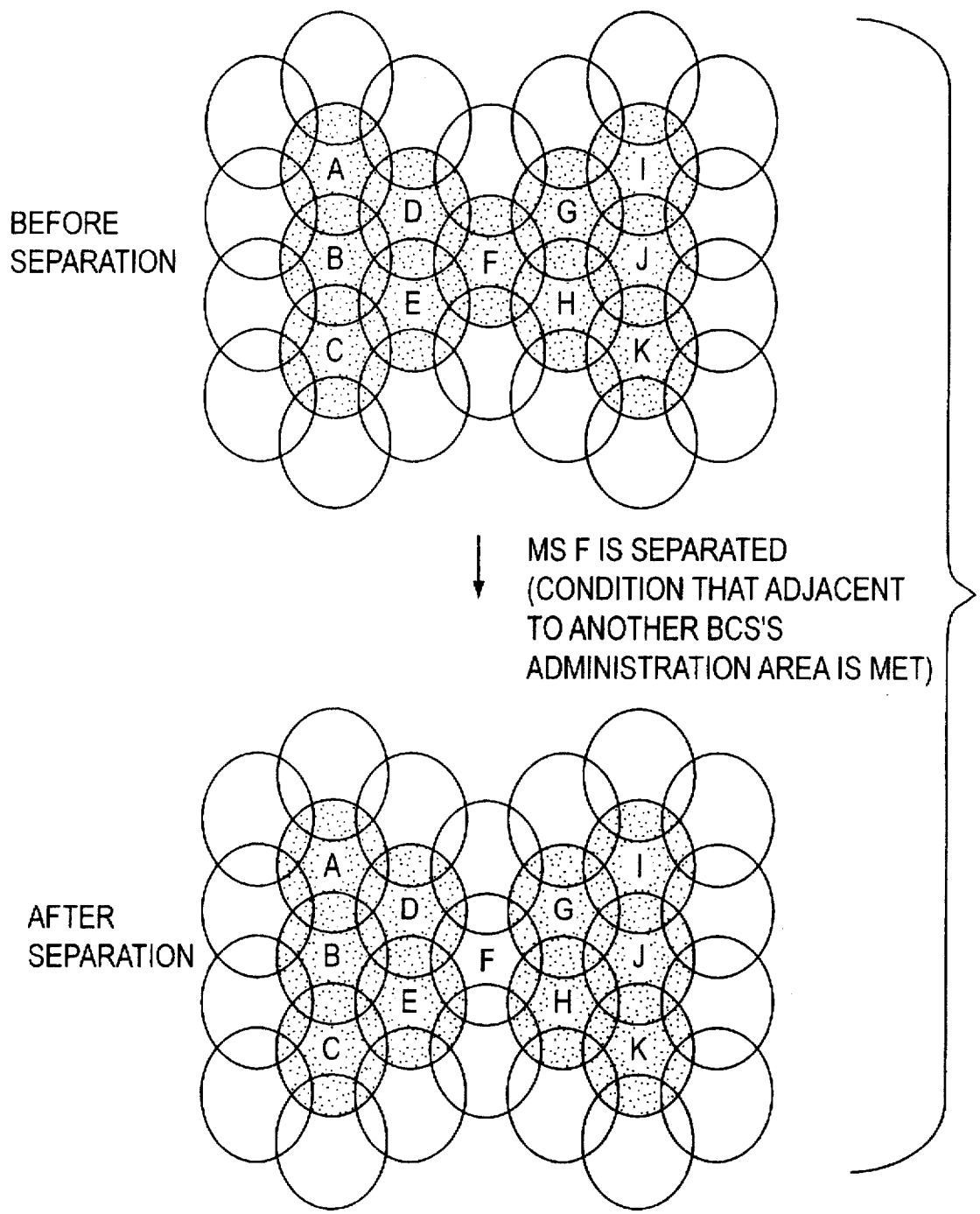
FIG. 26 is a view for explaining separation of adjacent mobile base station with dividing the administration area.

To prevent this, base stations to be separated, for example, base stations M, Q and R must be selected from base stations A, B, C, D, G, H, L, M, P, Q, R and S that form the outline of the administration area. In a case where the original administration area is formed into a closed area while being connected by only one radio zone F as shown in FIG. 26, the administration area is divided into two sections as shown in the diagram below if the base station F is separated only from the decision criteria that the station F is neighboring to the administration area of the other base control station.

By using the following "shortest route" procedure, it can be decided that whether or not the administration area of the base control station will be divided as a result of the separation of any base station.

In usual, the base control station stores information about the radio zone adjacent to the radio zone under control of the base control station for hand-over control. Therefore, the base control station uses the information about the adjacent radio zone to detect the relationship between adjacent base stations. (1) The adjacent relationship among all base stations under the same base control station is expressed by a connection relationship matrix. That is, if two base stations are disposed adjacently, "1" is, as the distance, given to the intersection of a row and a column of two base station. If two base stations are not disposed adjacently, distance "0" is given to the intersection.

Figure 27:
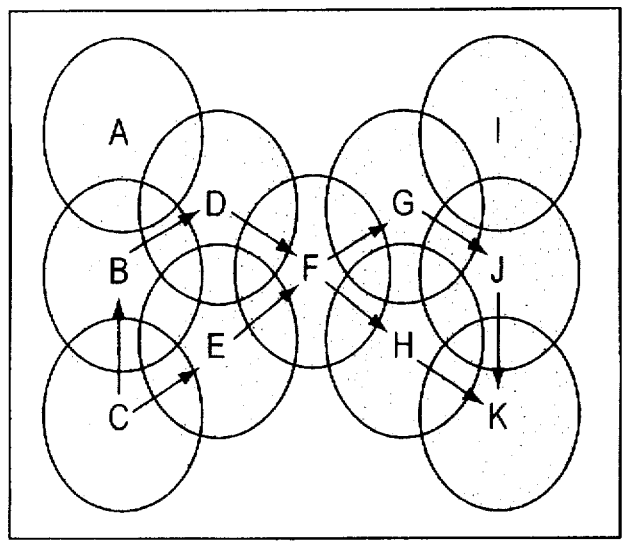
FIG. 27 shows the configuration of mobile base station before separation and a connection relationship matrix.
Figure 28:
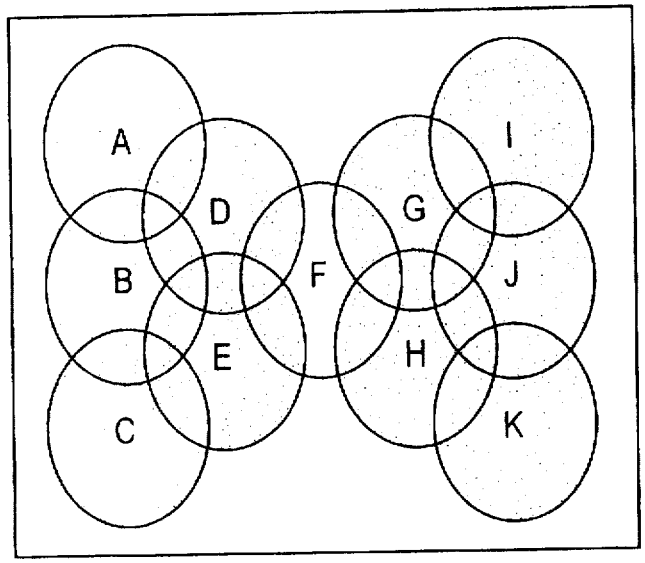
FIG. 28 shows the configuration of mobile base station after mobile base station F has been separated and a connection relationship matrix.

FIGS. 27 and 28 respectively show the configuration of base stations and connection relationship matrices, wherein FIG. 27 shows the radio zone configuration and matrix before the separation. The connection relationship matrix shown in FIG. 27 illustrates that base stations C, E, F, G, H, I, J and K corresponding to the row of the base station A or to the row or the column given distance "0" have radio zones that are separated from the radio zone of the base station A.

By tracing only the intersections of the connection relationship matrix that are given "1" to search a route that reaches the row or the column of another base station from the row of a certain base station, the number of the traced intersections is made to be the distance between the two base stations. In a case where the route cannot reach the row or the column of the aimed base station without passing through the intersection of "0", the distance between the two base stations is defined to be "0". If a plurality of routes exist, the route having the shortest distance is selected as the shortest route and a shortest-route matrix is made by using obtained shortest distance.

In the example shown in FIG. 27, the route from base station C to base station K is such that a continuous line passing through intersections given mark D has a distance of 6, and a dashed line route passing through intersections given mark O has a distance of 4. Therefore, the shortest distance is "4".

The shortest routes between base stations are expressed in the form of a matrix while disposing base stations on the row and the column, the matrix being a shortest-route matrix shown in FIG. 29. If all intersections of the shortest-route matrix are not "0", it is indicated that the administration area is not separated and all radio zones are connected. If an intersection of "0" exists, it is indicated that the radio zones of the base stations on the row and the column are separated.

Therefore, By making the foregoing shortest-route matrix which does not include the candidate base station to be separated and examining the intersections, it can be easily decided whether or not the new administration area after the candidate base station has been separated forms a closed area. In the shortest-route matrix shown in FIG. 29 relating to the administration area from which the base station F has been separated as shown in FIG. 28, intersections having distance "0" exist. That is, by separating base station F in FIG. 27, the administration area under control of the base control station is divided.

When a base station to be separated is selected from a plurality of candidate base stations, if a base station having the maximum quantity of control signals is selected, it is much effective to release the congestion in the separating-side base control station. However, the consigned-side base control station has a risk of encountering a process congestion because it is consigned the base station having the maximum quantity of the control signals. As a matter of course, the consignment is rejected. As a result, the congested base control station has a possibility that all requests to the adjacent base control station are rejected. The reason for this is that the base control station adjacent to the congested base control station, in almost cases, also has a somewhat large load of call processing. If a base station having the minimum quantity of control signals is selected, the possibility to achieve the consignment will be raised. However, the congestion improvement per separation is weakened, increasing the number of consigning operations because the number of base stations to be separated increases. Therefore, a base station having an adequate quantity of control signals must be selected as the subject to be separated.

By considering the above-mentioned various conditions, the procedure of separating a base station according to the present invention is performed as follows.

(1) A base station, which is inscribed in the boundary of the administration area of a base control station, is selected.

The base control station stores, as information for controlling the subordinate base stations, the address of each of the base stations adjacent to the subordinate base stations and that of the base control station for controlling the adjacent base stations, the information being stored as station data. The station data is supplied at the time of the system build-up as constitution information of the radio zone. The base control station refers to the station data, and select some subordinate base stations to be supervised, which have any adjacent base station subordinate to another base control station.

(2) The selected base stations are subjected to sorting in regard to the number of received control signals per unit time.

The base control station supervises by counting the number of control signals received from each base station in a predetermined time. Then, the base control station performs sorting such that the base stations are rearranged in the descending order in connection with the number of the received signals.

(3) A candidate base station is extracted.

The upper positioned base stations among the sorted base stations have a possibility of being rejected by the consigned base control station. Therefore, base stations which has a number of received signals larger than a predetermined threshold are excluded from candidate station. The predetermined threshold is given at the time of starting the system as operation information for the base control station.

(4) In the descending order in terms of the number of received control signals, the residual base stations are consigned to a base control station that controls the adjacent base stations.

(5) It is decided whether or not the administration area of the base control station is divided, by separating the consigned base stations. Then, the base stations which dose not cause the administration area separation are separated from the control.

According to the foregoing present invention, the state of congestion of the base control station due to increase in the quantity of traffic for call processing can be prevented. Therefore, loss of calls in the mobile station can be reduced and the quality of the mobile communication system can be improved. If the operation of the base control station must be stopped due to a maintenance work or the like, the control of the base stations is consigned to an adjacent base control station. Therefore, the operation of the subordinate base station can be continued. Even if the base control station cannot be operated due to a failure or the like, the control of the base stations can be consigned to an adjacent base control station. Therefore, the reliability of the mobile communication system can be improved.

Referring to FIGS. 30 to 40, it will be described that the modification of the constitution of a location area according to seventh embodiment of the present invention.

Figure 30:
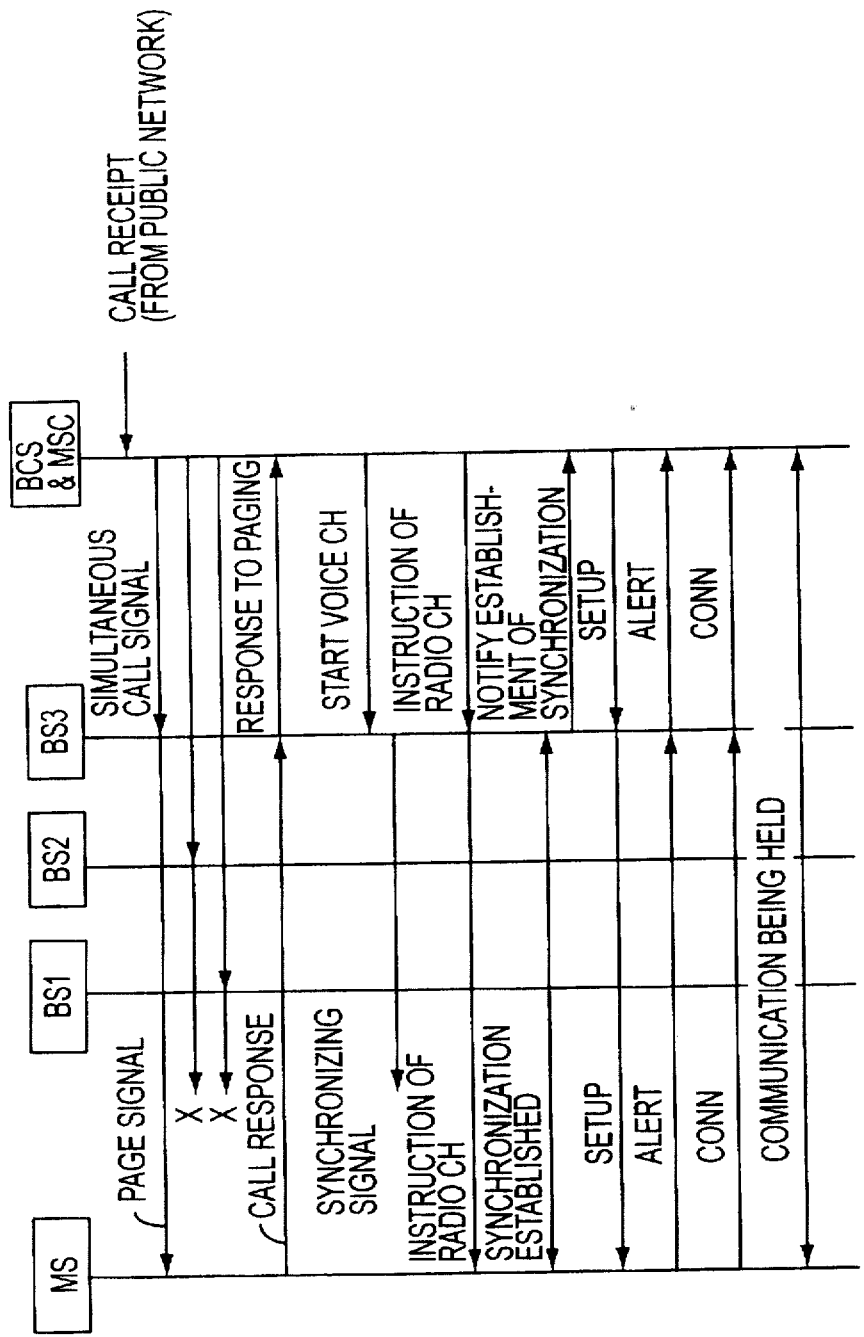
FIG. 30 explains a call receipt procedure at the mobile station.

Referring to FIG. 30, a procedure of causing a mobile station to receive a call will now be described.

When a mobile network receives a call from, for example, another public network to a mobile station in the service area thereof, the mobile network detects the location No. of the location area in which the called mobile station exists from subscriber information in the home memory. Then, page signals are transmitted simultaneously through all base stations (base stations 1, 2 and 3) in the location area having the foregoing location No.

The called mobile station receives the page signal from the base station 3 in the radio zone thereof. Then, the mobile station returns a response signal corresponding to the page signal to the mobile network through the base station 3.

The mobile network recognizes that the subject mobile station is existing in the radio zone of the responded base station 3, and then the call receiving procedure is performed through the control channel of the base station 3.

The base station 3 starts the voice channel to transmits a synchronizing signal for the voice channel, and as well as notifies the voice channel through the control channel. After synchronization of the voice channel has been established in the mobile station, establishment of the synchronization is notified through the control channel. Then, the network and the called mobile station perform call connection SETUP, ringing ALERT and line connection CONN so that a call state is realized.

In the seventh embodiment of the present invention, plural types of methods of constituting a location area are previously determined to correspond to the amount of processing load relating to paging process. That is, the normal constitution and a plurality of constitution corresponding to the congestion are previously determined, and information required to modify the constitution has been supplied to the mobile network. Then, the quantity relating to the paging process for the mobile station in each location area is supervised. If a fact has been detected that the quantity relating to the load of paging process exceeds a predetermined modify-threshold in a case where a normal constitution is employed, an adequate congestion constitution is employed. If the foregoing load is smaller than a restoration threshold in a state where the congestion constitution is employed, the normal constitution is employed. The modification of the constitution of the location area is performed by decreasing the number of radio zones in the same location area, which has encountered congestion and by including the decreased radio zones into the adjacent location area. Specifically, it is performed by changing the location No. to be given to the radio zone.

The mobile network (the mobile service switching center) is previously supplied with control information about the constitution of the location area to be employed in a usual state and the congestion state, that is, the method of changing the location No. of the radio zone among the radio zones constituting the location area which has encountered congestion.

FIGS. 31 to 34 shows a flow chart of a process of changing the constitution of the location area.

Referring to FIGS. 31 to 34, "location No. change 1" surrounded by double lines means a change process for changing the constitution of the location area from the usual constitution to the constitution for the congestion state, while "location No. change 2" means a process of returning the constitution for the congestion state to the usual constitution. The base control station and the mobile service switching center in the mobile network respectively have adequate roles to perform the foregoing change process.

Figure 31:
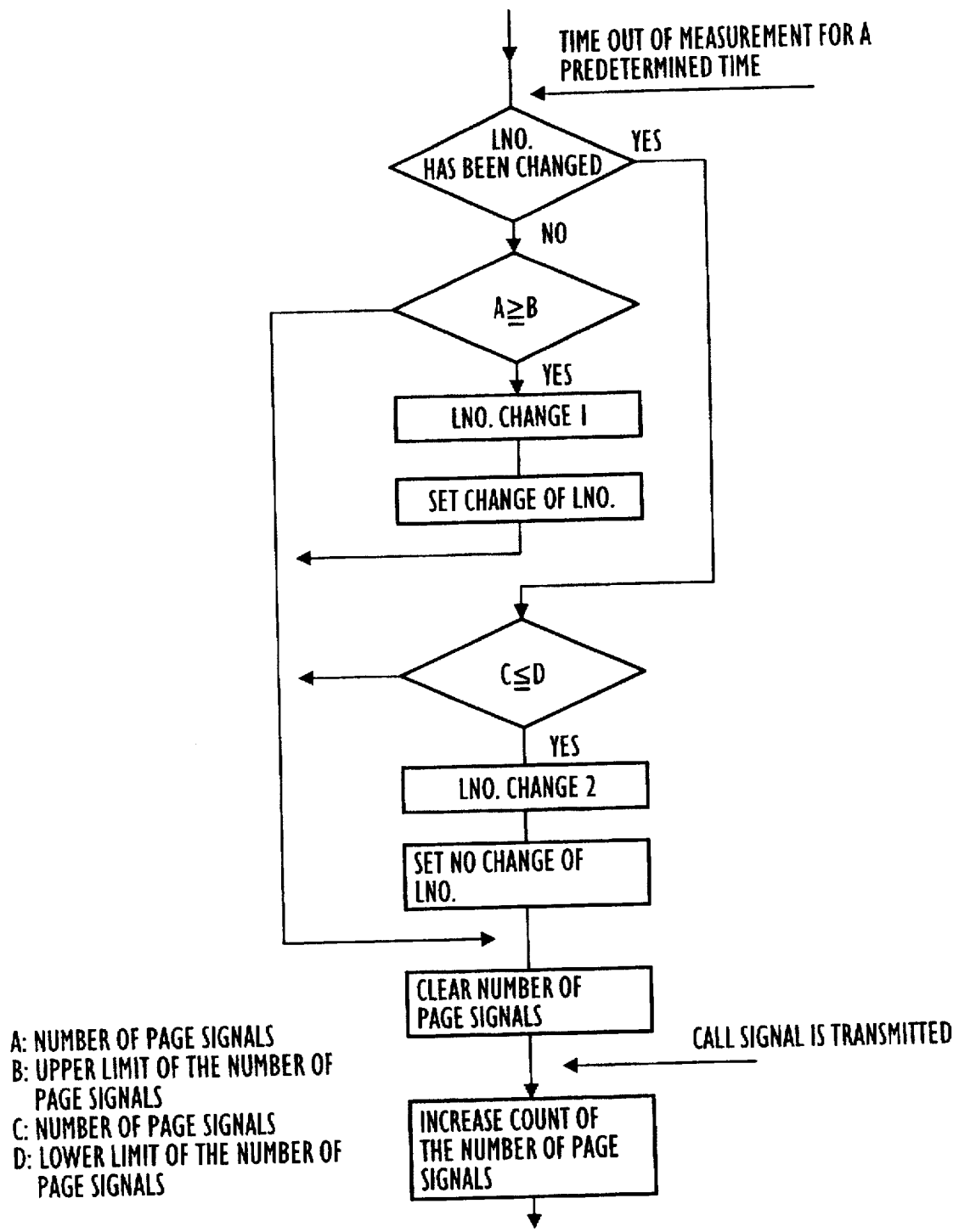
FIG. 31 is a flow chart of a constitution changing process on the basis of the number of transmission of page signals.

FIG. 31 is a flow chart for changing the constitution on the basis of the number of transmitted page signals.

The network has a counter for counting the number of page signals for each location area (the location No.) to count the number of transmissions of page signals due to a call is made to the mobile station, the number being counted for each location No.

Whenever the time out of the timer takes place, the mobile network checks whether or not the number of transmissions of the page signals for each location area exceeds a predetermined uppermost value in a case where the status information is "the location No. is not changed". In a case where the status information is "the location No. is changed", the mobile network checks whether or not the number of transmissions of the page signals for each location area is smaller than a predetermined lowermost value.

If the mobile network has detected that the number of transmissions of the page signals for each location area exceeds the uppermost value, it decides that the control channel for transmitting a page signal to the mobile station in the location area has been congested. Then, the mobile network changes the constitution of the location area to the congestion constitution and set the status information to "the location No. is changed". That is, the mobile network changes to a predetermined No., the location No. of a predetermined radio zone in the location area which has been congested. If the number of transmissions of the page signals for each location area is smaller than the lowermost value, the congestion constitution is returned to the usual constitution. That is, the location No. of the predetermined radio zone is returned to the original value and the status information is set to "the location No. is not changed".

Figure 32:
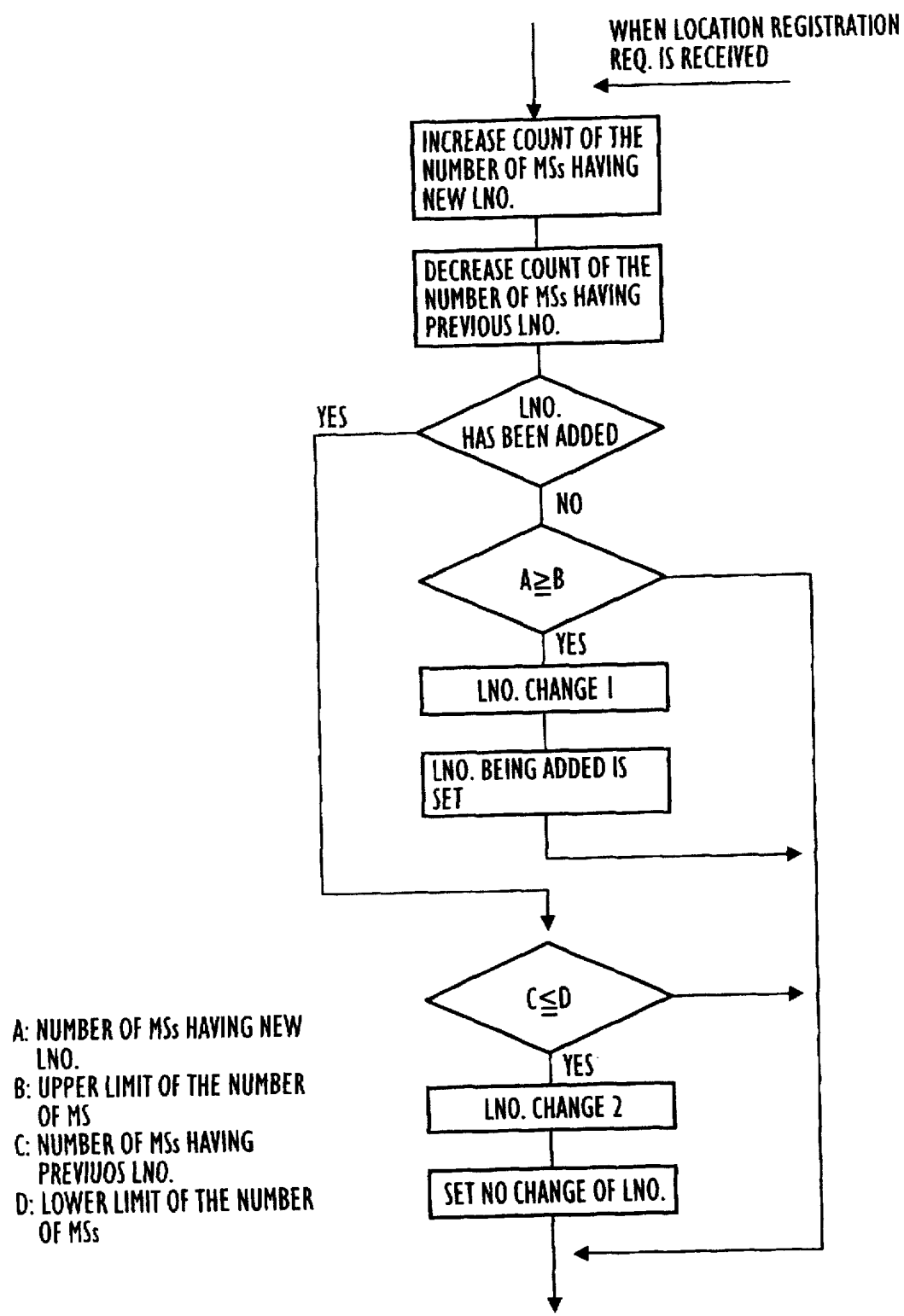
FIG. 32 is a flow chart of a constitution changing process on the basis of the number of mobile stations in the area.

FIG. 32 is a flow chart showing the constitution changing process on the basis of the number of mobile stations in the subject zone.

In this method, a counter for counting the number of mobile stations in the subject zone is provided for each location No. Whenever the network receives a location registration request from a mobile station, the network increases the count of the counter for the location No. (new location No.), the registration of which has been demanded by the mobile station. Furthermore, the network decreases the count of the counter for the location No. (the previous location No.), in which the mobile station has been registered.

Thus, the network changes the number of mobile stations in the subject zone in the two location areas relating to the location registration demand. As a result, the network always recognizes the number of mobile stations in the subject zone for each location No. (the location area).

If the count of the counter increases or decreases due to the location registration demand and as well as "the location No. is not changed" has been set in the location area corresponding to the counter, the count of which has been increased, whether or not the increased count, that is, whether or not the number of mobile stations in the subject zone, which has been increased due to the new location registration demand, exceeds a predetermined uppermost value (the change threshold value) set to the location area. If it is larger than the uppermost value, the process is performed which changes the constitution to the congestion constitution, that is, the process is performed which changes the location No. of a predetermined radio zone of the subject location area to another predetermined location No. Furthermore, "the location No. is changed" is set to the status information relating to the location area.

If "the location No. is changed" is set to the location area corresponding to the counter, the count of which has been decreased, whether or not the decreased count is lower than a predetermined lowermost value (the restoration threshold value). If it is lower than the lowermost value, the changed constitution of the location area is restored to the original constitution and "the location No. is not changed" is set to the status information.

Figure 33:
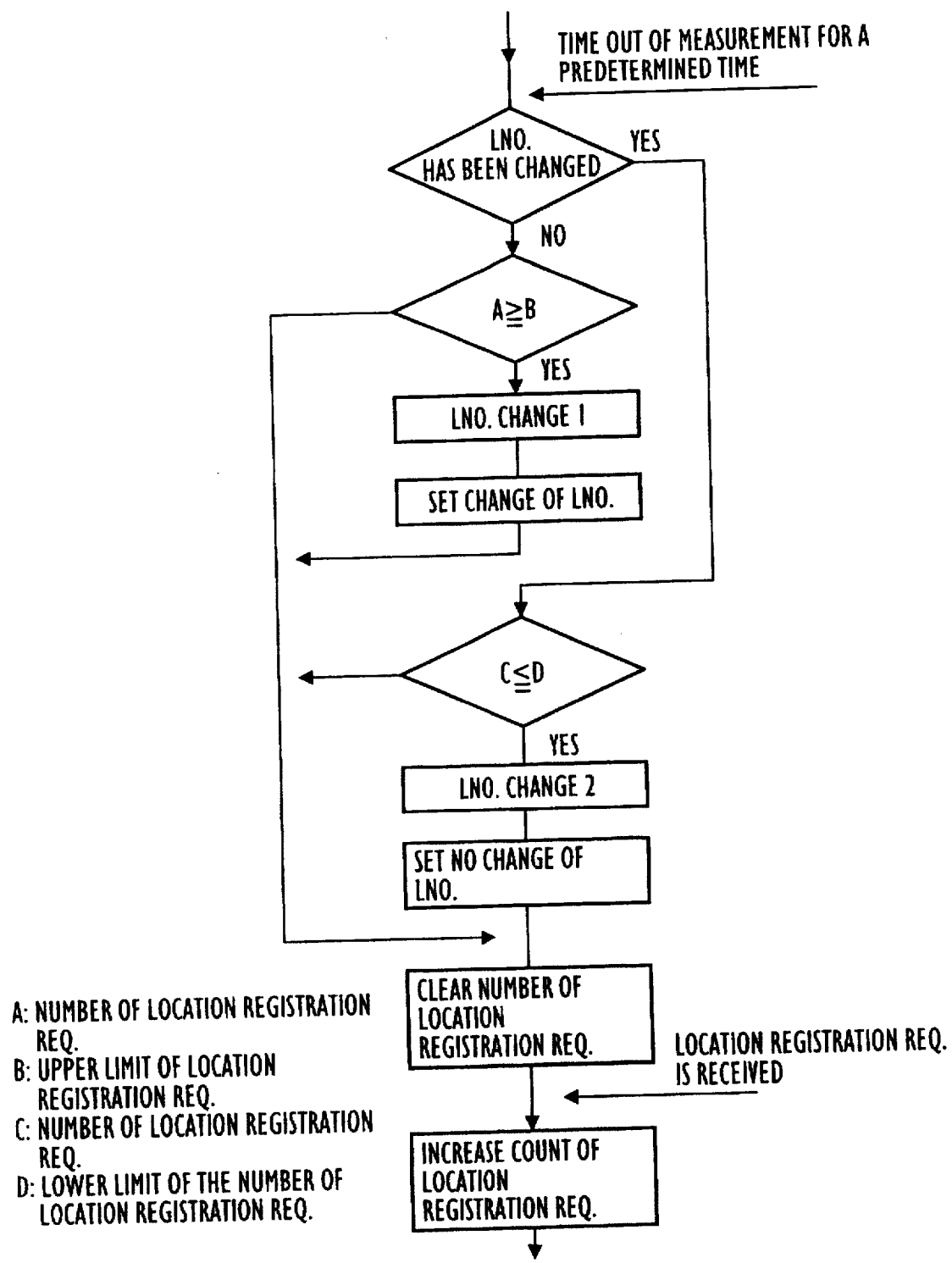
FIG. 33 is a flow chart of a constitution changing process on the basis of the number of location registration request.

FIG. 33 is a flow chart showing a process of changing the constitution on the basis of the number of location registration demands.

In this method, a counter for counting the number of location registration demands is provided for each location area. Thus, when the network has received a location registration request from a mobile station, it increases the count of the subject counter. The foregoing operation is performed for each of predetermined time units to supervise the frequency of generation of the location registration request. The location area in the state of "the location No. is not changed", that is, with the usual constitution and the foregoing generation frequency of which exceeds the predetermined uppermost value is changed to a predetermined congestion constitution. The location area in the state of "the location No. is changed", that is, with the congestion constitution and the generation frequency of which is lower than the predetermined lowermost value is returned to the original usual constitution. The foregoing method is advantageous to detect congestion of the location registration traffic and to change the constitution of the location area to the congestion constitution.

Figure 34:
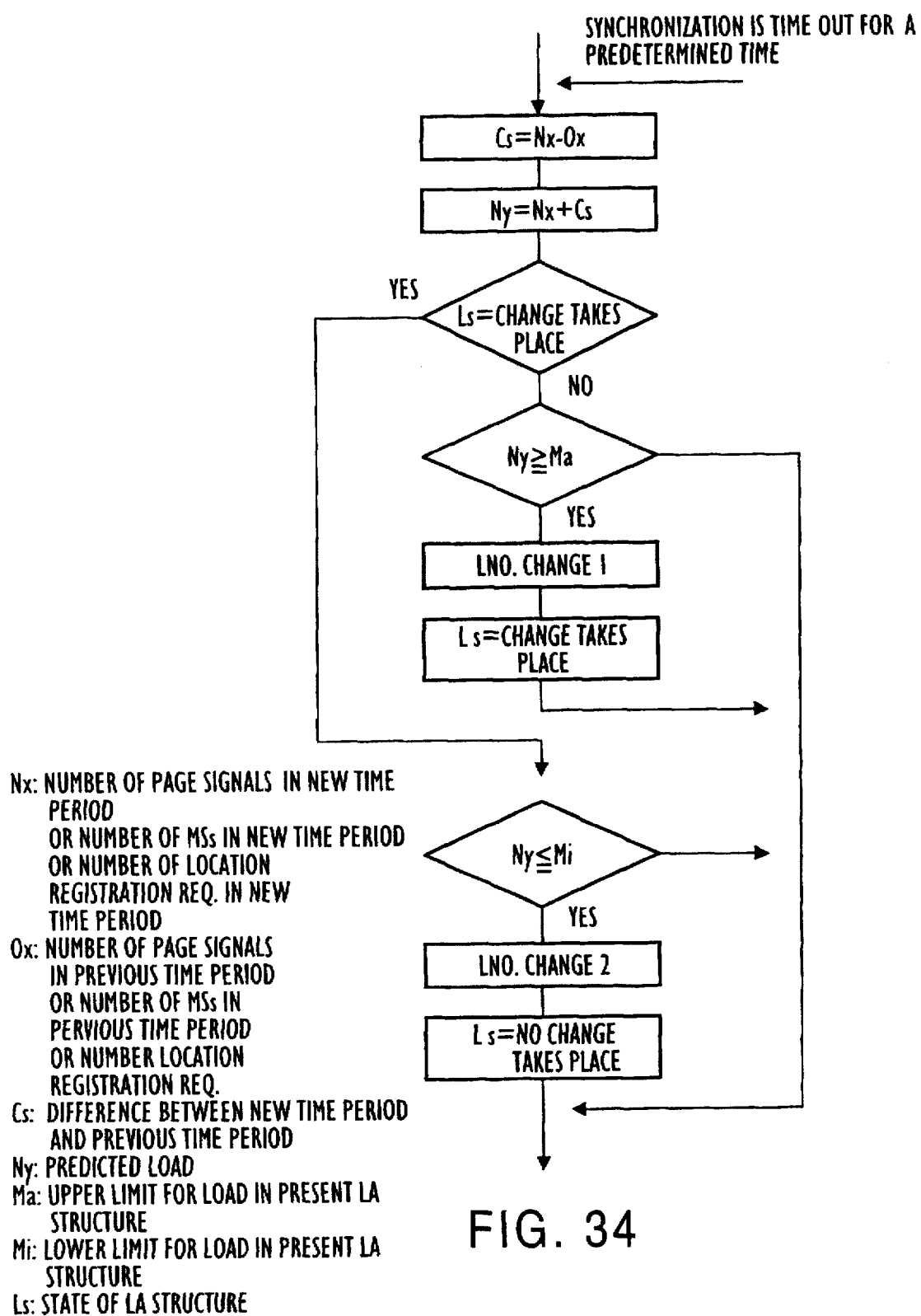
FIG. 34 is a flow chart of a constitution changing process on the basis of a predicted quantity of load.

FIG. 34 shows a load prediction changing method in which the quantity of load at the next measurement of the load is predicted from the change ratio of the quantities of various loads in place of the absolute values of the various loads; and the predicted value and a threshold are subjected to a comparison to change the constitution.

That is, as shown in FIG. 34, the load (the number of transmissions of page signals or the number of location registration requests or the number of mobile stations in the subject zone) is supervised at each measuring time. In accordance with the difference between the load quantity OX at the previous measuring time and load quantity Nx at the present measuring time, the change value Cs in the quantity of load is obtained. The obtained value is added to the load quantity Nx at the present measuring time so that predicted load quantity Ny at the next measuring time is obtained. By using the predicted load quantity, the process for changing the constitution of the location area is performed in accordance with the flow shown in FIGS. 31 to 33.

According to the foregoing method, the constitution is changed prior to the congestion state is generated. Therefore, the congestion state can be prevented. According to the present invention, the changing process is performed before a cause for the changing process is generated. Therefore, even if the changing process takes a long time, a satisfactory effect can be obtained.

Another constitution changing process may be employed which is a constitution changing process on the basis of the statistical value of a load parameter.

The state of the traffic usually repeats the same pattern at periodic intervals, such as days, weeks and years. Therefore, the network is provided with a means for accumulating the past change patterns of the load quantity, which is the subject to be detected, as the statistical value. The foregoing means stores the quantity of load for each time from one month ago to yesterday to calculate an average value by using detected value for 29 days, which is a subtraction of that for 30 days ago from the detected quantity of load for 30 days, and the detected value at a subject time of today. By using the average load quantity, whether or not the constitution of the location area is changed is decided.

Then, the way of modifying the location area for overcoming the congestion will now be described with reference to an example of the constitution at the time of congestion.

FIGS. 35 to 38 show examples of constitutions of location area for use in a usual state and a congestion state.

Referring to the foregoing drawings, symbol O shows the radio zone for the base station, and figures in O show the location No. given to the radio zone.

Figure 35:
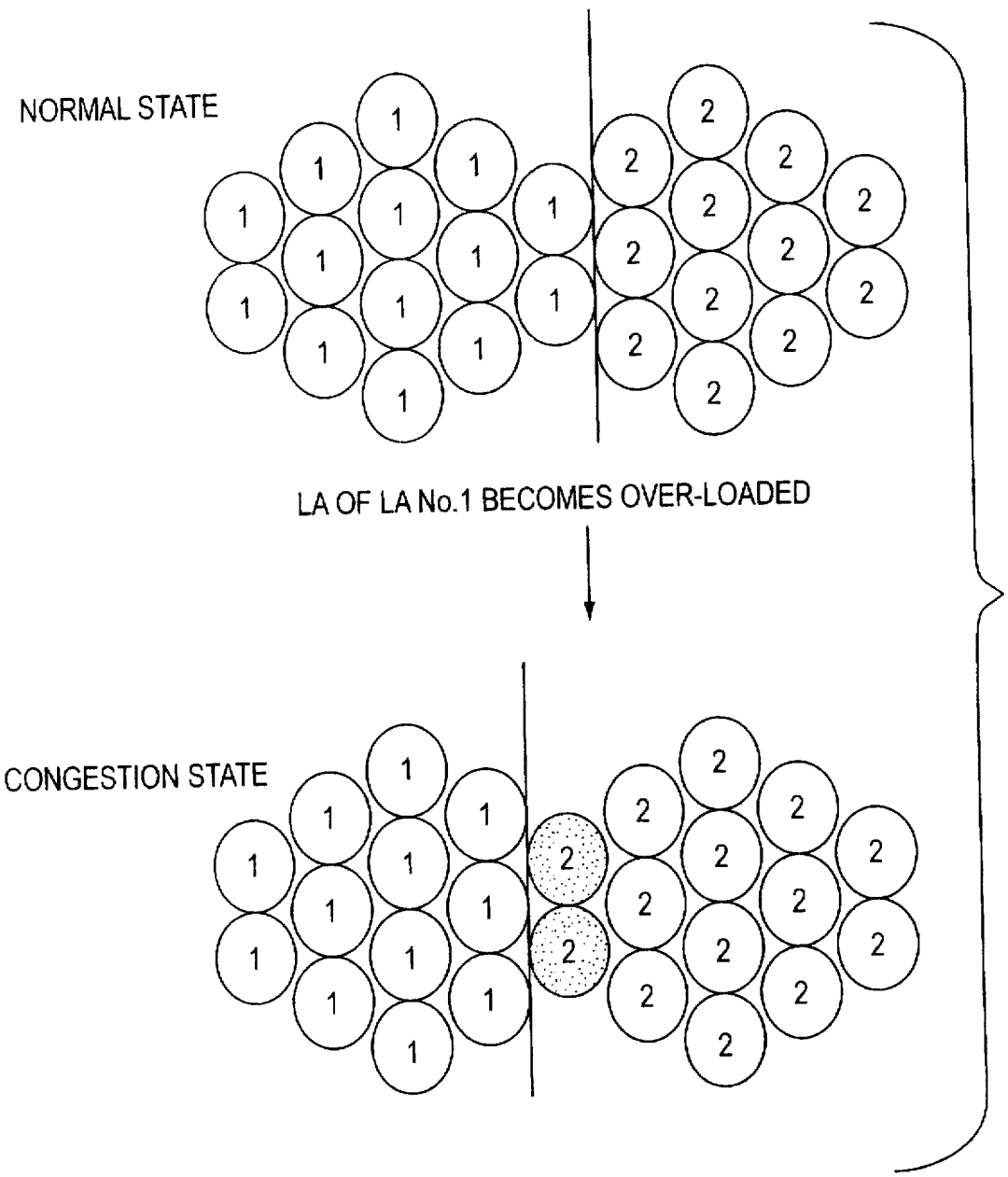
FIG. 35 shows an example of the constitution of a dispersion-type changing method.

FIG. 35 shows the constitution of the location area for use in a congestion state by using a dispersion-type modifying method. With the foregoing constitution method, the location No. of the radio zone inscribed in the boundary of the congested area is changed to the location No. of the location area circumscribed with the foregoing boundary so that the congested location area is reduced.

Referring to FIG. 35, a portion of a radio zone constituting a location area (in FIG. 35, a radio zone, the location No. of which is 1) in which the call control process is too heavy load is dispersed to a adjacent location area (in FIG. 35, a radio zone, the location No. of which is 2). Two radio zones with half-tone dot meshing are given location No. 1 in a usual constitution and location No. 2 in a congestion constitution. Then, the locations of the mobile stations present in the two radio zones are registered with location No. 2 so that paging is made with the control channel of the location area having the location No. 2 if a phone call is received. As a result, congestion of the control channel taking place due to the simultaneous paging of the location area having the location No. 1 can be overcome satisfactorily.

Figure 36:
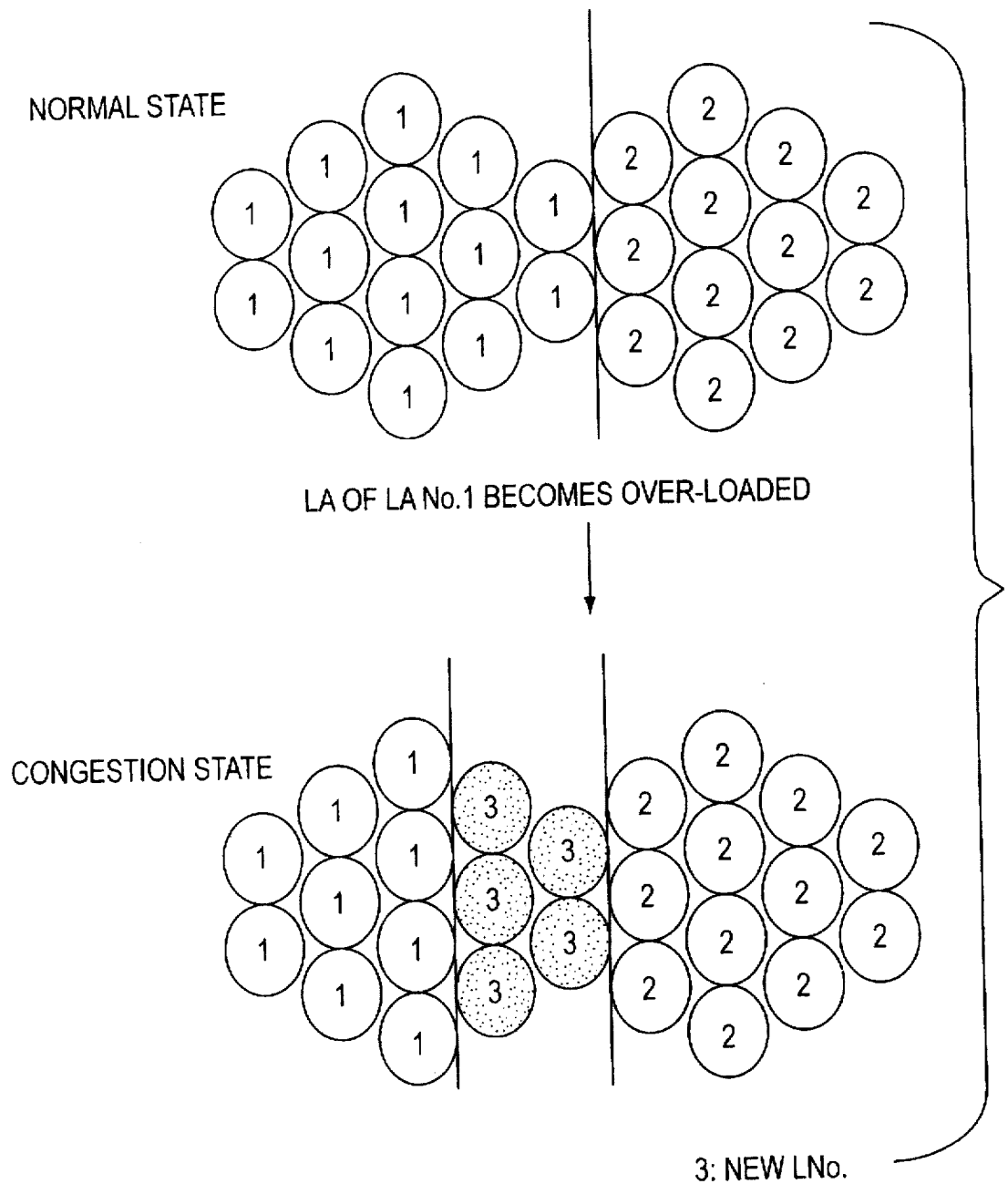
FIG. 36 shows an example of the constitution of a location No. increasing method.

FIG. 36 shows a location No. increasing method in which a portion of radio zones in the congested area is separated; the separated radio zones constitute a new location area; and the new location area is given a new location No. which has not been used in the system.

That is, a portion of the radio zones constituting the location area (in FIG. 36, a radio zone having a location No. 1), in which the load of the call control process is too heavy in a usual constitution, is given a new location No. (in FIG. 36, location No. 3) which is different from the adjacent location area (in FIG. 36, a radio zone having location No. 2) so that the location area is divided to create a location area to serve as a constitution at the time of congestion.

The created location area consists of two radio zones indicated by symbol O with half-tone dot meshing. The locations of the mobile stations present in the radio zone are registered with location No. 3. Therefore, the load for calling the location area with location No. 1 can be reduced.

Figure 37:
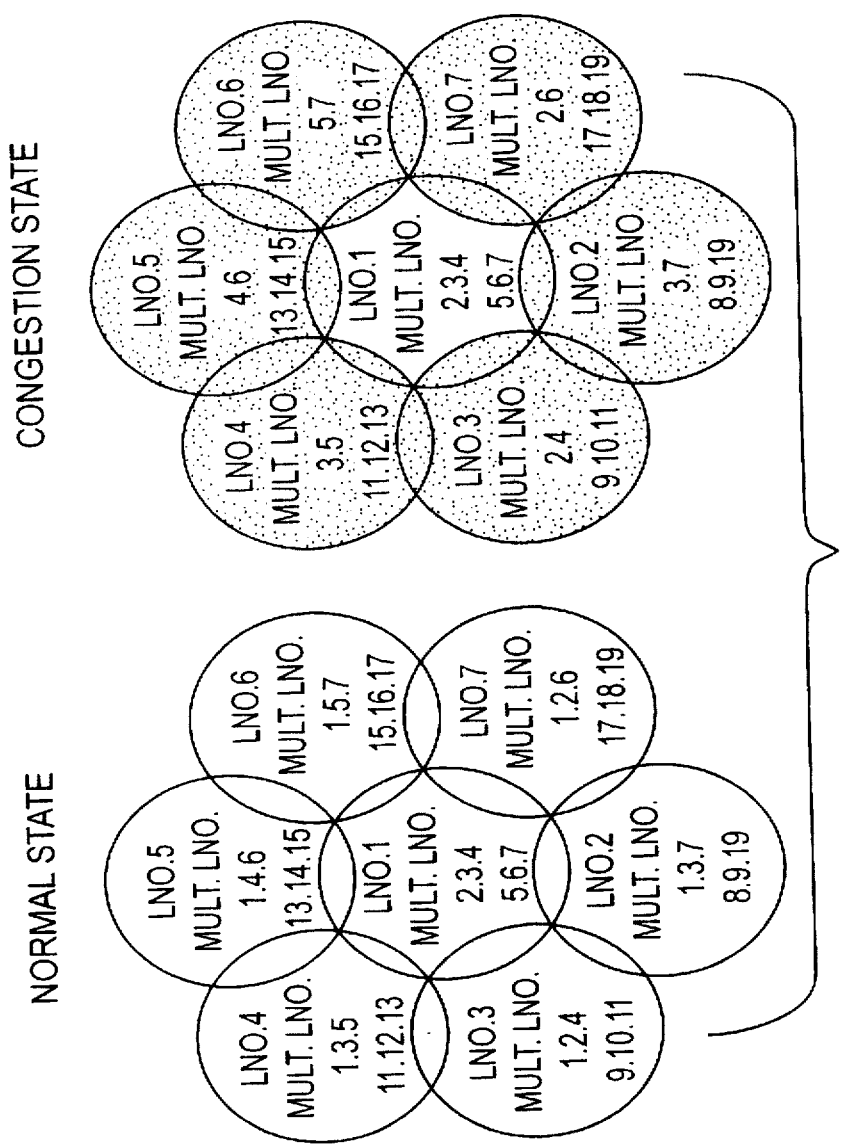
FIG. 37 shows an example of the constitution of an own-location No. deletion method (a multi-location No. method)
Figure 38:
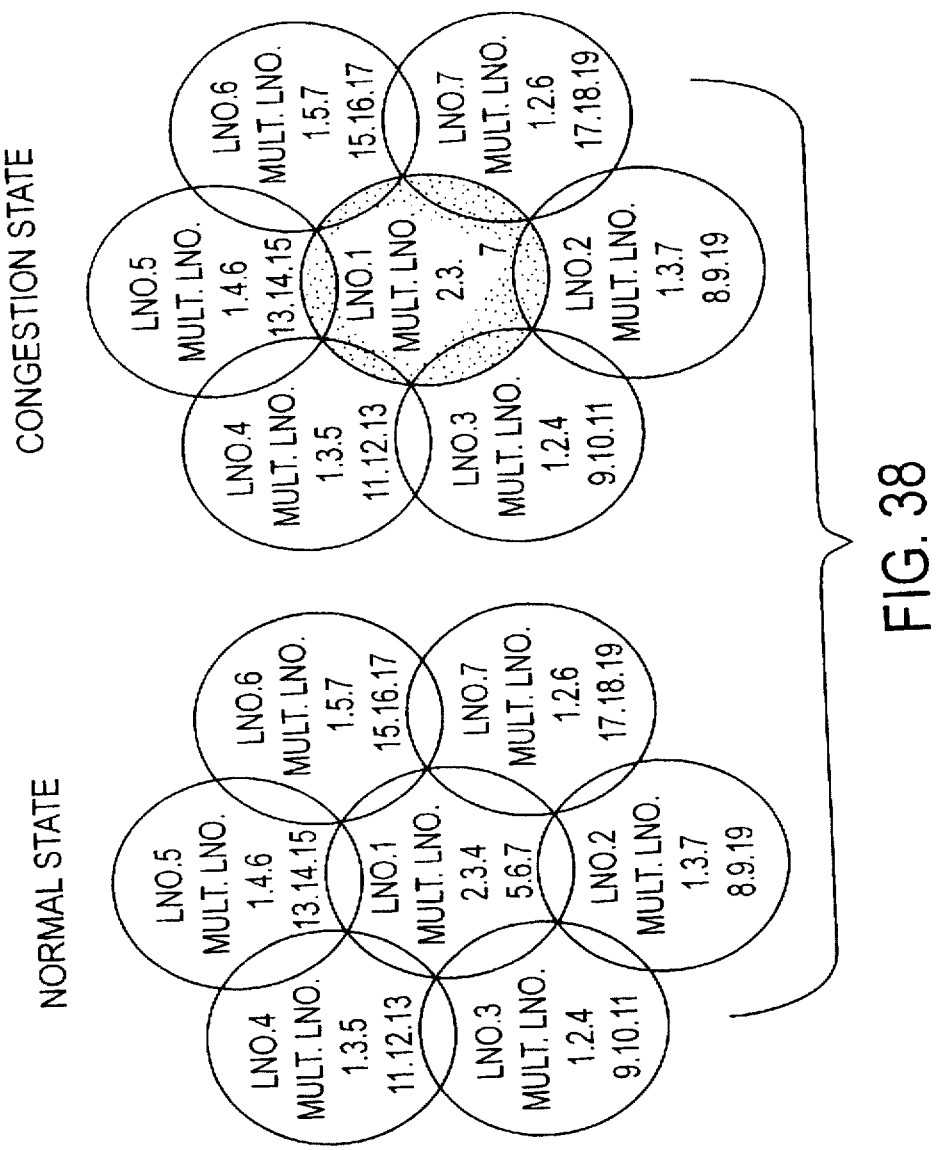
FIG. 38 shows an example of the constitution of an another location No. deletion method (a multi-location No. method)

FIGS. 37 and 38 show examples of constitutions in a mobile communication system which employs a multi-location-No. method.

The usual constitutions shown in the right portions of FIGS. 37 and 38 have the same area constitution. By using the foregoing constitution, the multi-location-No. method will now be described. Referring to FIGS. 37 and 38, each radio zone is given the location No. and the multi-location-No. For example, the radio zone in the central portion of the drawing is give location No. 1 and multi-location-No. 2, 3, 4 and 5. The multi-location-No. is the same as the location No. of the radio zone adjacent to the central radio zone. Even if a mobile station, the location of which has been registered in the adjacent radio zone (for example, a radio zone having location No. 2), is moved to the central radio zone, novel location registration is not performed in a case where the location No. (for example, location No. 2) of the registered radio zone is included in the multi-location-No. The call of the mobile station, which is registered with location No. 2, is performed such that all radio zones given the location No. 2 and those having the multi-location-No. which includes 2 are called.

According to the multi-location-No. method, even if a mobile station is moved from a radio zone, in which its location has been registered, to an adjacent radio zone having different location No., the location registration process is not generated. Therefore, the location registration traffic can be reduced. However, the location area, which is the subject of the simultaneous paging, is widened, and thus the load to call is made heavier.

As a constitution for use in a congestion state in a case where the foregoing multi-location-No. method is employed, either of the following methods is employed to meet the desire: a method (an own location No. deletion method) shown in FIG. 4-9 in which the own location No. is deleted from the multi-location-No. of the adjacent radio zone; and a method (another location No. deletion method) shown in FIG. 4-10 in which the location No. of the adjacent radio zone is deleted from the multi-location-No. in the own radio zone.

Referring to the structural views in the right portions of FIGS. 38 and 39 which show the location area for use in a congestion state, circles with half-tone dot meshing indicate radio zones, the multi-location-No. of which has been changed.

In the own location No. deletion method shown in FIG. 38, location No. 1 among the multi-location-No. given to six radio zones with half-tone dot meshing adjacent to the radio zone having the location No. I in the process congestion state is deleted.

In a usual constitution, if the mobile station, which is present in the radio zone having the location No. 1 and, the location of which has been registered with location No. 1, is moved to the radio zone having the location No. 5, 1 is given to the multi-location-No. of the radio zone to which the mobile station has been moved. Therefore, location No. is not changed and a call is made with location No. 1. In a congestion constitution, location No. 1 has been deleted from the multi-location-No. of the adjacent radio zone. Therefore, if the mobile station, the location of which has been registered with location No. 1, is moved to an adjacent radio zone, for example, to a radio zone having location No. 5, a discrimination is made that movement between location areas has been performed. Therefore, location registration is performed such that the mobile station is present in a zone having location No. 5. Then, a call is made with location No. 5. In this constitution, no mobile station, the location of which has been registered with location No. 1, is present in the adjacent radio zone, and therefore the number of mobile station having location No. 1 decreases. Thus, the call traffic with respect to location No. decreases and congestion in call can be overcome.

The another-location No. deletion method shown in FIG. 39 has an arrangement that location Nos. 4, 5 and 6 are deleted from the multi-location-No. of the radio zone having location No. 1 that constitutes the congested area. Therefore, no request of a call is made to the mobile stations having multi-location-Nos. 4, 5 and 6 with respect to the radio zone having the location No. 1. Therefore, the number of calls with respect to the congested area decreases. However, if the mobile station, the location of which has been registered with location Nos. 4, 5 or 6, is moved to the radio zone having location No. 1, the location registration process is performed. Therefore, the number of location registration processes in the location area having location No. 1 increases.

In FIGS. 35 to 38, four types of constitutions for use in a congestion state have been described. The constitution employed varies the state where the load parameter is changed after the constitution has been changed. FIG. 39 shows change in the quantity of various processing loads in the congested area and an adjacent location area (hereinafter called an "adjacent area") in a case where the constitution of the location area has been changed to any of the congestion constitutions to overcome the congestion in the location area (hereinafter called a "congested area") in which congestion has been detected. The change of the constitution of the location area to be performed when congestion of the call process has been detected is performed by selecting the most effective congestion constitution to reduce the excess load while considering the type of the detected quantity of the load and the state of load in the adjacent location area. In the dispersion method, the load in the own-location area is reduced such that all parameters, such that the location registration, call and the number of mobile stations are reduced in the dispersion method. However, the load acting on the own location area is completely dispersed to the adjacent location areas. Therefore, the load in the adjacent area is increased.

In the location No. increasing method, only the own location area is divided. Therefore, the adjacent area is not affected. However, whenever the mobile station moves between the created location area and the present location area, the location registration is performed. Therefore, the load of the location registration process is increased.

As a result, in a case where the constitution is modified to the congestion constitution due to the excess load in the own location area, the location No. creating method is employed if the paging is excess load and the location registration traffic has a marginal quantity. If both paging traffic and the location registration traffic are in the excess load state, the dispersion method is selected.

Even with the dispersion method, setting of the congestion constitution such that a plurality of location areas are instructed as the location areas to which the dispersion is made prevents enlargement of the load in the adjacent area. If a constitution is employed in which an adjacent area, having a light load at the subject time can be instructed at real time, further ideal location area can be constituted.

Figure 40:
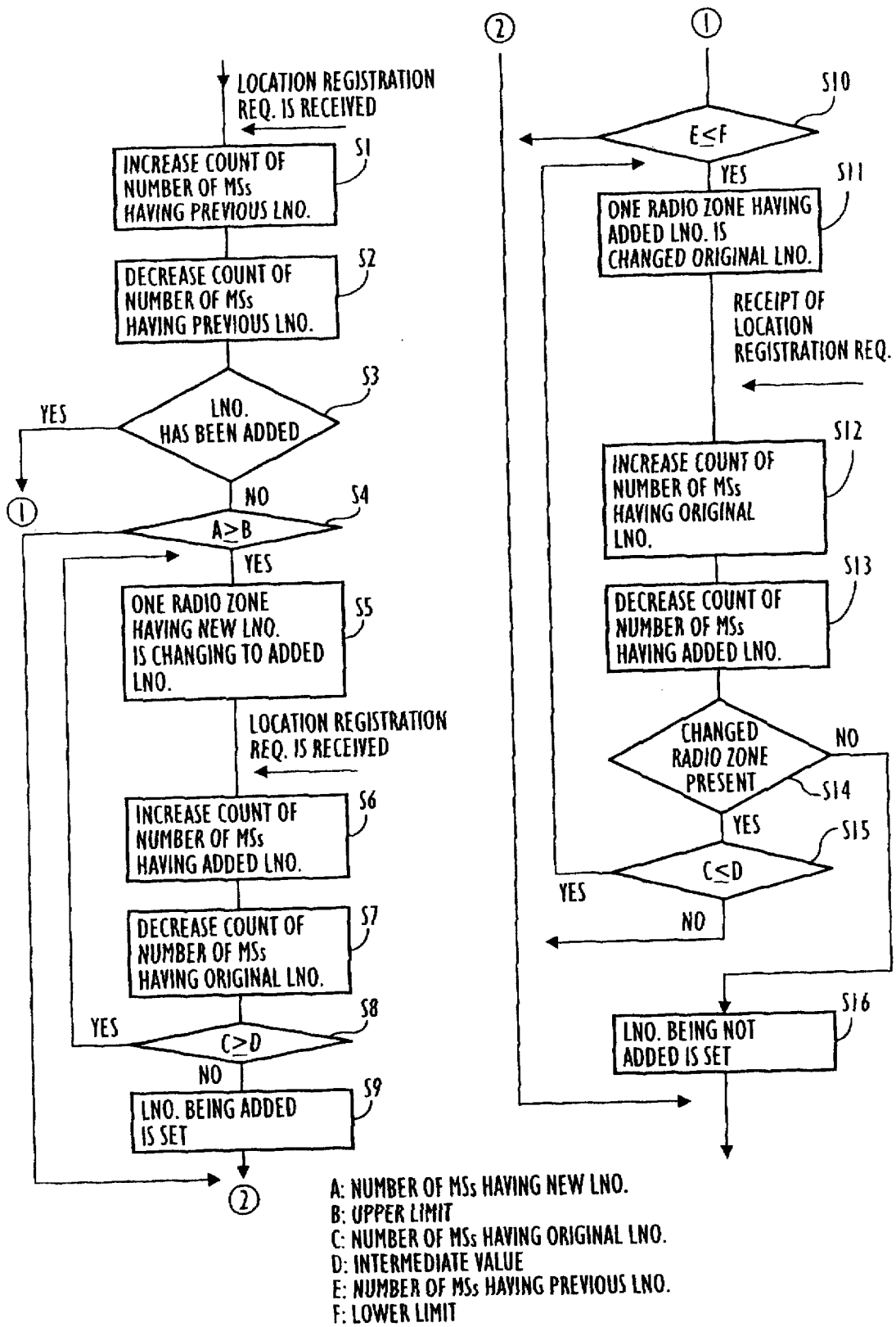
FIG. 40 is a flow chart of a process for changing the constitution of the adaptable location area on the basis of the number of mobile stations in the area.

FIG. 40 shows a flow chart of an embodiment of a system constituted by combining the changing method shown in FIG. 32 in which the number of mobile stations in the subject zone is used as the load quantity detection parameter and a location No. increasing type constitution for use in a congestion state shown in FIG. 36, the flow chart showing the process of changing the constitution of the location area.

Whenever the network receives a location registration request from a mobile station, the network updates the counter for counting the related mobile stations in the zone to always recognize the number of mobile stations in each of the location areas (S1 and S2). If the "location No. is increased" is not set in the location area, the number of the mobile stations of which has been changed (S3), whether or not the number of the mobile stations in the zone is larger than a predetermined upper limit is decided (S4). If it is larger than the upper limit, the location No. of one of the radio zones in the subject location area is changed to the increased location No. (S5).

As a result, all mobile stations in the radio zone, the location No. has been changed, require location registration with the changed location No. (increased location No.). Thus, the count of the counter for the increased location No. is increased (S6), while the count of the counter for the original location No. is decreased (S7). Whether or not the number of mobile stations having the original location No. has reached a predetermined intermediate threshold (previously set to an intermediate value between the lower limit and the upper limit) is decided (S8). If it does not reach the intermediate threshold, the operation returns to S5 in which the location No. of another radio zone in the location area having the original location No. is changed to the increased location No. Thus, the radio zone having the created location No. is increased one by one until the number of the mobile stations having the original location No. is smaller than the intermediate value. If the number of mobile stations having the original location No. is smaller than the intermediate value (S8), "location No. is increased" is set to the status information of the location area having the original location No. (S9).

If the number of mobile stations in the zone is smaller than the upper limit in S4 or if the state "the location No. is increased" is realized in S9, the process for changing the constitution of the location area is not performed and the operation returns to the initial state.

In a case where "the location No. is increased" has been set to the location area, in which the number of the mobile stations in the zone has been changed in S3, whether or not the number of mobile stations in the zone, the location No. of which has been decreased, is smaller than the lower limit is decided (S10). If it is not smaller than the lower limit, no process is performed. If the same is smaller, one of the radio zones having the increased location No. is returned to the original location No. (S11). As a result of returning of the location No., the location registration demand is issued from all mobile stations in the foregoing radio zone with respect to the original location No. Therefore, count of the number of the mobile stations having the original location No. is increased (S12). On the other hand, count of the number of the mobile stations having the increased location No. is decreased (S13). In a case where a radio zone having the increased location No. is left (S14), whether or not the number of the mobile stations having the original location No. is smaller than the foregoing intermediate value is decided (S15). If the number of the mobile stations is smaller, the operation returns to SI in which the location No. of another radio zone having the increased location No. is returned from the increased location No. to the original location No. If the number of the mobile stations having the original location No. is larger than the foregoing intermediate value in S15, no process is performed. If no radio zone having the increased location No. is present in S14, "the location No. is not increased" is set to the status information of the location area and the operation returns to the initial state.

Thus, in accordance with the number of the mobile stations in the zone, the size of the location area can be changed to plural steps each having the size of the radio zone. Therefore, the congestion prevention can be performed finely.

According to the foregoing present invention, the constitution of the location area can be changed to correspond to the degree of congestion in the call control. Therefore, success ratio at the time of call is sent to the mobile station can be raised, and therefore the service quality of the mobile communication can be improved. Since the number of the control channels at the simultaneous call can be made optimum, the waiting state for the receiver of the mobile station can be shortened and the battery of the mobile station can be saved.

What is claimed is:

1. A mobile communication system comprising:
    a mobile communication network comprising
        a mobile service switching center,
        a plurality of base control stations, each connected to the mobile service switching center, and
        a plurality of base stations controlled by the base control station, each base station communicating via a radio channel with a mobile station located in a cell of each base station; and
    the mobile station, radio channel of which is switched when the cell in which the mobile station is located is changed, wherein the mobile station comprises:
        a switching selection setting up means for a mobile telephone user to set up in said mobile station whether a channel switching during-a-call is to be set up; and
        a switching selection notifying means for notifying to said base station whether said channel switching-during-a-call has been set up, and
    the mobile communication network further comprises:
        a channel switching prohibiting means for prohibiting the radio channel from being switched and for setting up a minimum receiving level lower than a usual minimum receiving level when said switching selection notifying means prohibits the channel switching during-a-call, said minimum receiving level being utilized to determine that the call is to be terminated.

2. A mobile communication system as recited in claim 1, wherein the mobile station further comprises a switching-requiring cause notifying means for notifying said user, when a cause to request the switching arisen, that said cause to request the switching has arisen.

3. A mobile communication system as recited in claim 1, wherein
    said switching selection setting up means sets up, when a call is placed, whether said channel switching-during-a-call for the present call is to be performed; and
    said switching selection notifying means notifies the base station, when a request for setting up a call is transmitted, of said setting up of whether said radio channel switching-during-a-call is performed.

4. A mobile communication system comprising:
    a mobile communication network comprising
        a mobile service switching center,
        a plurality of base control station each connected to the mobile service switching center, and
        a plurality of base stations controlled by the base control station, each base station communicating via a radio channel with a mobile station located in a cell of each base station; and
    the mobile stations, radio channel of which is switched when the cell in which the mobile station is located is changed,
    wherein the mobile station comprises:
        a switching request setting up means for a mobile telephone user to set up in said mobile station a request for switching the radio channel during a call; and
        a switching request notifying means for notifying the network of said request set up for switching the radio channel; and
    said mobile communication network further comprises:
        a radio channel switching means, upon receiving said request for switching the radio channel, for selecting a second one of the base stations, said second base station having a highest receiving level from said mobile station among neighboring base stations in the vicinity of a first one of the base stations, said first base station presently communicating with said mobile station, and for switching the radio channel presently communicating with said mobile station, and for switching the radio channel via said second base station.

5. A mobile communication system comprising:
    a mobile communication network including a plurality of base stations,
    a plurality of base control stations, each controlling a plurality of said base stations exclusively, and
    a mobile service switching center connected to each of said base control stations, and
    a mobile station located in a cell of one of said base stations, for communicating control data for processing a call via a control channel and a talk signal via a talk channel to the mobile station's own base station, wherein said base control station comprises:

a load detecting means for detecting a load of the control data being processed via the control channel, and a subordinate base station quantity changing means for changing a quantity of said base stations under control of said base control station so that said loads at each of said base control stations become equal.

6. A mobile communication system as recited in claim 5, wherein the load detecting means detects that the control processing is in congestion, according to an operating rate of a CPU or an operating rate of a receiver buffer in the own base control station; and the subordinate base station quantity changing means separates some of base station under control, which are then transferred to be subordinate of other base control station, whereby the quantity of subordinate base station is decreased.

7. A mobile communication system as recited in claim 6, wherein the base control station selects out of the base stations a candidate base station to be separated in consideration that the area under control be not divided, and thus selected candidate base station is transferred so as to be subordinate of said other base control station.

8. A mobile communication system as recited in claim 7, wherein each of the plurality of base stations and each of the plurality of base control stations are connected via a network configuration capable of multi-link, which is constituted so that a connection or a release is possible between an arbitrary one of the base control stations and an arbitrary one of the base stations, whereby a subordinate base station can be transferred to a subordinate of other base control station.

9. A mobile communication system as recited in claim 8, wherein the base control station allows the control signal in communication with the subordinate base station thereof to bypasses a processing block in the own base control station so as to transmit via the mobile service switching center to said other base station, whereby said some of the subordinate base stations is/are transferred to be subordinate of said other base control station.

10. A mobile communication system as recited in claim 8, wherein a control channel of the base station to the network is constituted so as to be capable of connecting to the plurality of base control stations, whereby the base control station transfers connection of said control channel with the subordinate base station to connection with said other base control station so that said some of the subordinate base stations is/are transferred to be subordinate of said other base control station.

* * * * *